United States Patent [19]

Kuehn, Jr.

[11] 3,992,240

[45] Nov. 16, 1976

[54] METHOD AND APPARATUS FOR FABRICATING ELONGATE LAMINATED STRUCTURES

[75] Inventor: Riley Kuehn, Jr., Auburn, Wash.

[73] Assignee: The Boeing Company, Seattle, Wash.

[22] Filed: May 19, 1975

[21] Appl. No.: 578,887

[52] U.S. Cl. ............................ 156/250; 156/263; 156/269; 156/510; 156/511; 156/519; 156/522
[51] Int. Cl.² ........................................ B32B 31/00
[58] Field of Search ............ 156/433, 180, 436, 181, 156/353, 361, 441, 324, 323, 543, 549, 555, 552, 580, 519, 520, 302, 303, 264, 265; 425/371, 397, 317, 501, 505; 264/757, 758, 137, 299, 316; 242/71.8, 75.4, 68, 68.3, 263, 269, 511, 512, 517, 518, 522, 510, 250, 516

[56] References Cited
UNITED STATES PATENTS

| | | | |
|---|---|---|---|
| 2,918,104 | 12/1959 | Scott et al. | 156/180 |
| 3,185,603 | 5/1965 | Boggs | 156/436 |
| 3,227,388 | 1/1966 | Masini | 156/519 |
| 3,581,698 | 6/1971 | Bete | 114/102 |
| 3,638,878 | 2/1972 | Morris | 212/128.8 |

*Primary Examiner*—William A. Powell
*Assistant Examiner*—Michael W. Ball
*Attorney, Agent, or Firm*—Christensen, O'Connor, Garrison & Havelka

[57] ABSTRACT

In a pultrusion laminating process, a plurality of tapes or other elongate, yielding plies are longitudinally combined into a composite unit and drawn through a heated die which compacts the plies into a desired cross section and cures the resin to produce a laminated, elongate structure. Method and apparatus are provided herein in combination with such a pultrusion system, for fabricating repetitive longitudinal tapers in the finished laminated structure.

22 Claims, 10 Drawing Figures

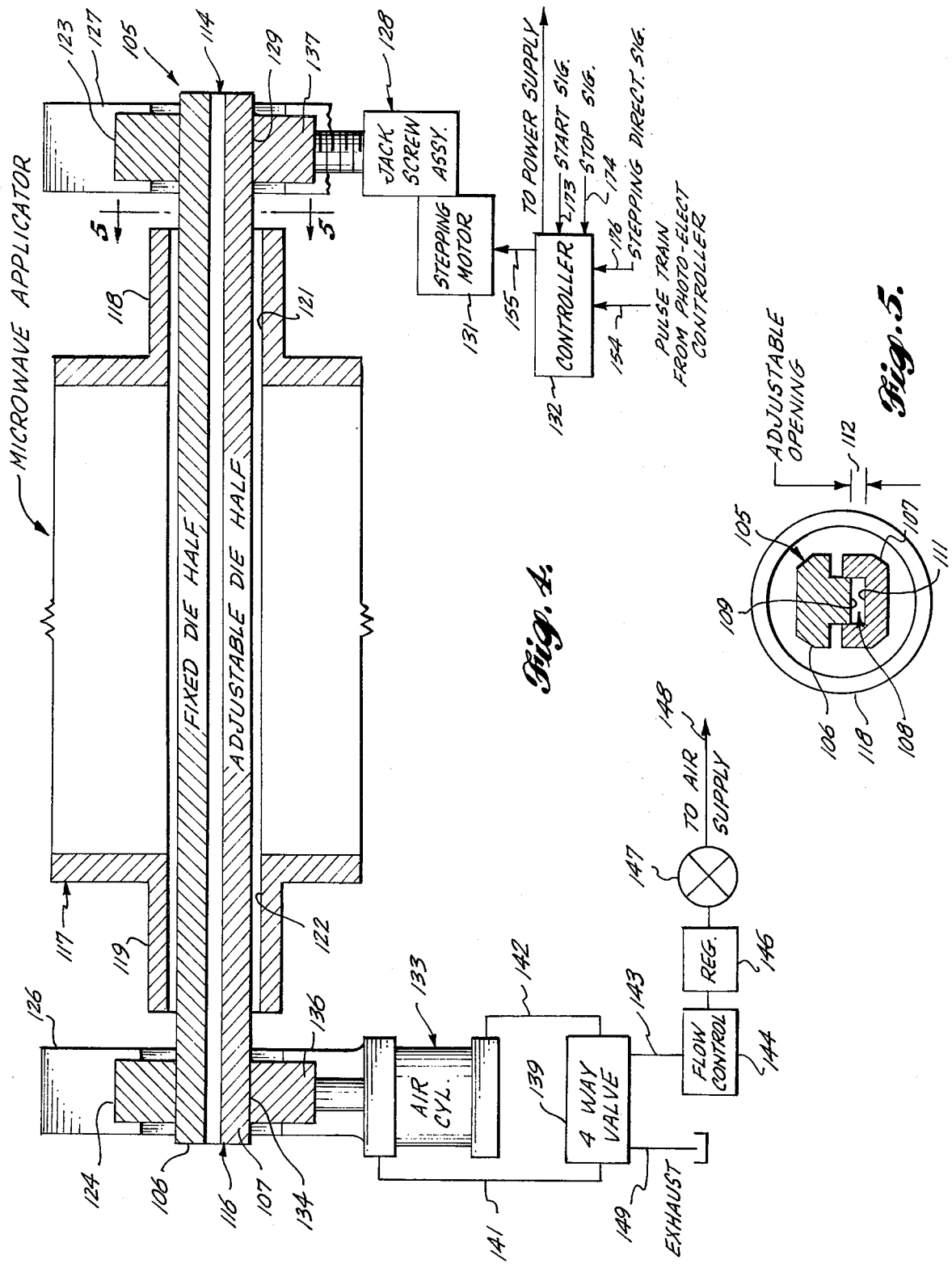

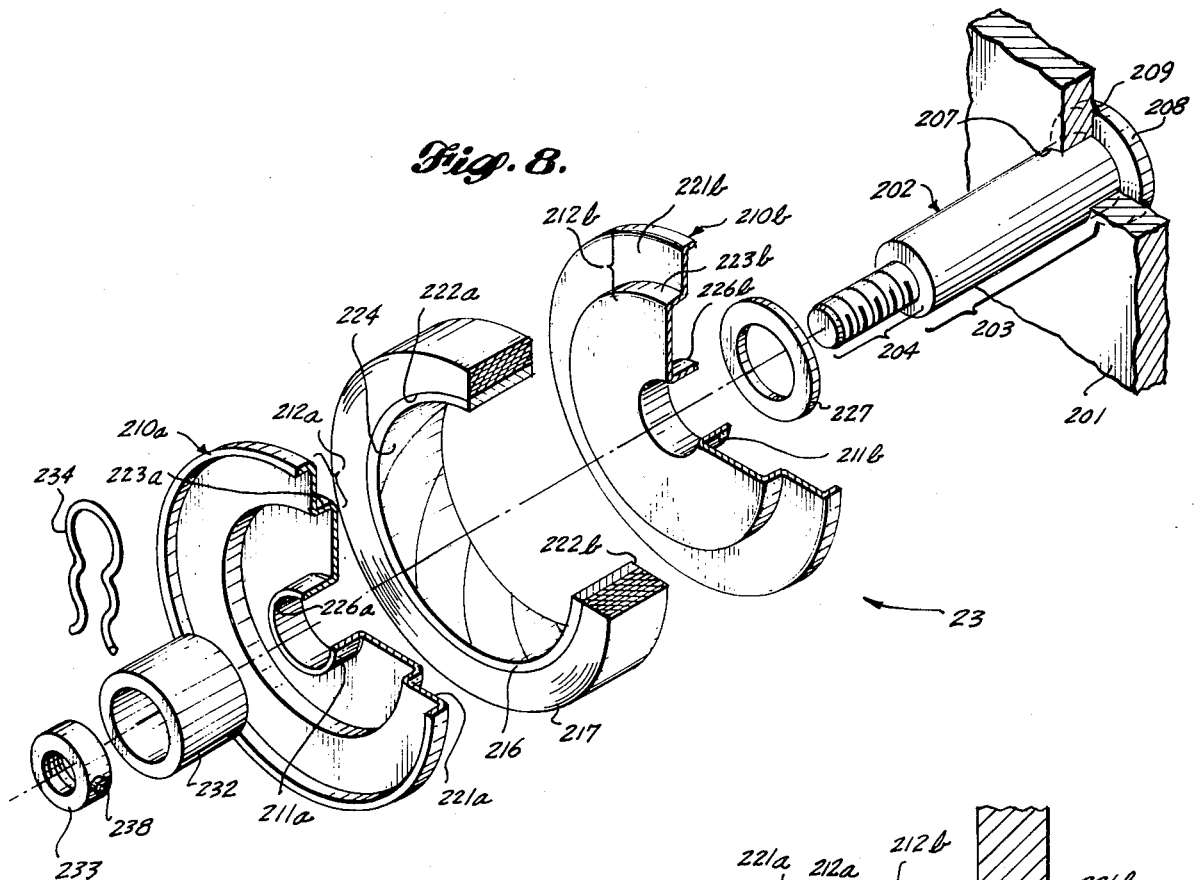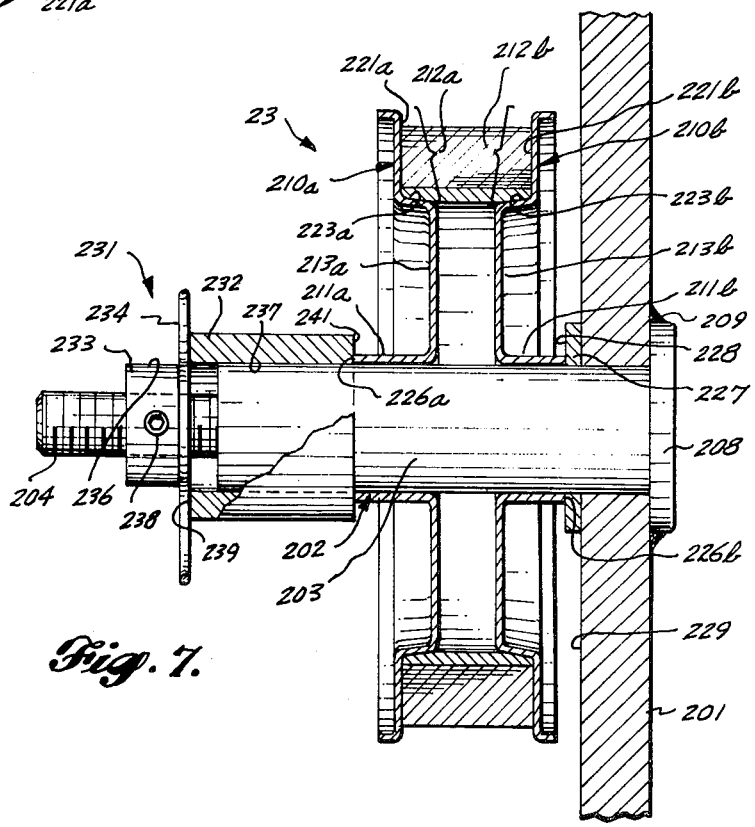

METHOD AND APPARATUS FOR FABRICATING ELONGATE LAMINATED STRUCTURES

BACKGROUND OF THE INVENTION

The present invention relates to method and apparatus for laminating a plurality of tapes or other elongate yielding plies.

The utility of structures fabricated by laminating a plurality of elongate, substantially continuous plies, such as tape plies, has been established. For example in the aircraft industry, high-modulus, lightweight laminated structures have been successfully used in airframe construction. In such an application, where minimal weight is not only desirable but in many cases essential, laminated plies of resin impregnated fibers are employed, to produce structural ocmponents which in many cases are preferably to lightweight metals, such as aluminum, or at least a suitable alternative thereto. The individual plies forming the resulting structure are usually provided in the form of webs or tapes, each tape being made up of a multiplicity of longitudinal, or sometimes cross-ply, fibers which may be either pre-impregnated with resin and wound on supply reels for later use, or drawn through a resin bath immediately prior to the combining and laminating stages.

For certain, advanced forms of these laminated structures, a particular laminating procedure known as a "pultrusion" process is employed. In such case, the tape plies are longitudinally combined and pulled as a composite unit through a heated die. The die which is similar to a draw die, compacts the tapes into a shape determined by the die cross section, while the heat simultaneously cures the resin. The process is usually continuous in the sense that the longitudinally aligned plies are substantially continuously drawn through the die, with the curing taking place while the material is within the heated zone of the apparatus. For high-modulus composite structures, the plies may be formed of resin impregnated filaments of glass, graphite, boron or various combinations thereof. while such materials may be supplied in the form of yard goods or wound tapes, the principal application of the present invention is to structures formed from elongate plies in which the length is many times greater than the maximum lateral or width dimension, as in the case of tapes.

A typical facility for pultrusion fabrication includes a tape feed system in which a plurality of rolls or spools of source tape are held and dispensed as needed to the downstream processing stations. From the tape feed facility, the plurality of tapes are guided into longitudinal and lateral alignment and combined, usually by overlaying one tape on another and pressing the confronting tape faces together. This latter process is sometimes referred to as a tape "lay-up" procedure. After combining the tapes in this manner they are pulled through the die, by a downstream puller facility, which may be provided by a "hand-over-hand" clamp or gripping mechanism which continuously or intermittently pulls the resulting structure through the pultrusion die. Rapid heating of the materials as they pass through the die is typically accomplished by dielectric or microwave heating, with the latter being preferred for high-modulus tapes.

In a pultrusion process the composite tapes or plies are pulled in a more or less continuous fashion through the die. However, other processes have been developed whereby the laminating step is effected in an intermittent or discontinuous process, sometimes called "step molding". An example of this so-called "step molding" process is disclosed in U.S. Pat. No. 2,977,630 issued to S. M. Blazer on Apr. 4, 1961. Other examples include a continuous laminating procedure as illustrated in U.S. Pat. No. 2,822,575 issued to R. W. Imbert et al. on Feb. 11, 1958, and another "step" process as shown in U.S. Pat. No. 3,236,714 issued to G. R. Traut on Feb. 22, 1966.

In general, method and apparatus of this type have involved the production of laminated structures having a cross section which is continuous throughout the length of the resulting product. However, in many cases, there is a need for laminated structures of this type which vary in cross section as a function of the structure length. For example, longitudinally tapered structural members are useful in the design and construction of airframes. In such case, a high-modulus laminated structure having a longitudinal taper, can be used for beams, spars, or stiffener caps, in which the magnitude of the load on the structural member varies as a function of its length. In such case, one end of the structural member may support a relatively large bearing or shear load, while the opposite member end has a relatively reduced load requirement. By positioning the relatively larger cross section portions of the member to receive and support the heavier load, the lighter load may be effectively carried by the relatively reduced cross section. It will be observed, that there is an improved weight-to-load ratio, in that the larger and heavier cross section is used only where required by the structural load. Additionally, there are situations in which a higher degree of flexure may be required for one longitudinal portion of the member as compared to another longitudinal section of the same member. This differential flexure or compliance may be advantageously provided by fabricating the laminated structure with one or more longitudinal tapers.

In general the formation of tapers and laminated structures is known, as indicated by U.S. Pat. No. 1,852,006 issued to H. A. Emery on Apr. 5, 1932; U.S. Pat. No. 2,827,412 issued to W. C. McKay on Mar. 18, 1958; and U.S. Pat. No. 3,581,698 issued to John U. Bete on June 1, 1971. However, these and other prior art systems and processes are not suitable for mass production of longitudinal tapers in a multiple ply, laminated structure formed from a plurality of elongate resin impregnated fiber plies.

SUMMARY OF THE PREFERRED EMBODIMENT OF THE INVENTION AND ITS OBJECTIVES

Accordingly, it is an object of the present invention to provide a method and apparatus for efficient, rapid production of laminated elongate structural members having longitudinal tapers. This object is especially directed to the production of high-modulus structural members formed from a plurality of resin impregnated plies, such as tape plies, longitudinally arranged and laminated together to form a composite structural member.

More particularly it is an object of the present invention to provide a method and apparatus for forming corss-sectional variations, such as longitudinal tapers, doublers, etc., in a continuous or substantially continuous elongate multiple ply laminated structure produced by combining a plurality of individual elongate, yieldable plies.

Still another object of the present invention is to provide the above method and apparatus in a pultrusion system in which the elongate laminated structure is formed by laying together a plurality of resin impregnated fibrous plies, and forcefully pulling such plies through a heated die, wherein the cross-sectional changes in the resulting laminated structure are substantailly automatically formed during the step of combining such plies.

Another object of the present invention is to provide an improved tape or ply feed facility, including demountable ply spool mounting fixtures having an adjustable braking drag for holding and dispensing the source plies.

In general these objects are achieved by a method and apparatus in which a plurality of tapes or other elongate, yielding plies are longitudinally combined into a composite unit and drawn through a heated die which compacts the plies into a desired cross section and cures the resin to produce a laminated, elongate structure. A facility for forming variable cross sections from the multiple plies is disposed between a tape feed station, which dispenses the tapes from a plurality of individual supply reels, and a laminating station at which the heated die is mounted. A puller mechanism located downstream of the laminating station provides the pull force for drawing the composite of plies from the dereeling station, through the variable cross section forming facility and through the heated die. The source tapes are fed through the section forming facility and guide means thereon provide longitudinal and lateral guiding of one or more continuous carrier tapes which serve as a structural base or foundation to which a plurality of variable or longitudinally intermittent tapes are added.

These interruptible or variable tapes are controlled by a series of tape guide and controller means also carried by the cross section forming facility. A separate tape controller is provided for each of a plurality of variable tapes received from the feed station and on command these controllers effect tape termination, by servering the tape as it is being pulled by the puller mechanism, and controlled tape start-up or commencement, by energizing tape feed roller means to recombine the leading end of the severed tape with the longitudinally traveling composite of plies. To fabricate longitudinal tapers, the plurality of controller means are positioned at spaced intervals along the continuous carrier tape so that simultaneous start-up, or in the alternative, timed sequential start-up, of the variable tapes by the controllers disposes the leading ends of the variable tapes at predetermined, spaced apart longitudinal positions on the continuous carrier tape.

Accordingly, the cross section of the resulting composite structure is varied in steps, in this example forming an increasing longitudinal taper, with the successive additions of the variable tapes or plies changing the cross-sectional character of the composite. The operation is reversed to form a trailing or decreasing taper, or other cross-sectional change, in which simultaneous or timed sequential severance of the variable tapes produces a step wise tapering reduction in the cross section of the composite, whereafter another leading taper (or other variation) may be commenced to form longitudinally repetitive cross-sectional variations. The composite tapes are thereafter fed through the heated die to complete the laminated structure.

The die may be provided with a variable cross section opening, changing in synchronization with the travel of the tape composite to accommodate the changing cross sections thereof.

The tape supply or feed station may be equipped with a plurality of quick-disconnect tape spool mounting fixtures for the plurality of reeled supply tapes. Each fixture provides an adjustable braking drag, which is preset and remains undisturbed during demounting and remounting of the supply tape spool.

These and further objects, features, and advantages of the method and apparatus in accordance with the present invention will become apparent to those skilled in the art from a consideration of the following detailed description and appended drawings of certain particular and preferred embodiments thereof.

BRIEF DESCRIPTION OF THE DRAWINGS.

FIG. 4 is still a further diagrammatic view in elevation illustrating an automatic method and apparatus for adjusting the cross section of a die through which the combined plies are pulled during the laminating process, wherein the controlled opening of the die is automatically synchronized with the advancement of the longitudinal tapers formed by the taper forming facility.

FIG. 5 is a transverse sectional view taken from section lines 5—5 of FIG. 4.

FIG. 6 is a diagrammatic view of an electromechanical sensing method and apparatus for providing signals to the control components of the variable die opening system of FIGS. 4 and 5, as a function of the position of the repetitive longitudinal tapers formed by the taper fabricating facility.

FIG. 7 is an elevational view, partly in axial cross section, illustrating one of the plurality of variable drag, tape spool mounting fixtures used for efficiently dispensing the plurality of individual supply tapes to the downstream taper forming and laminating stations.

FIG. 8 is an exploded perspective view of the demountable tape spool fixture shown in FIG. 7.

DESCRIPTION OF PREFERRED EMBODIMENTS

Figure 1:
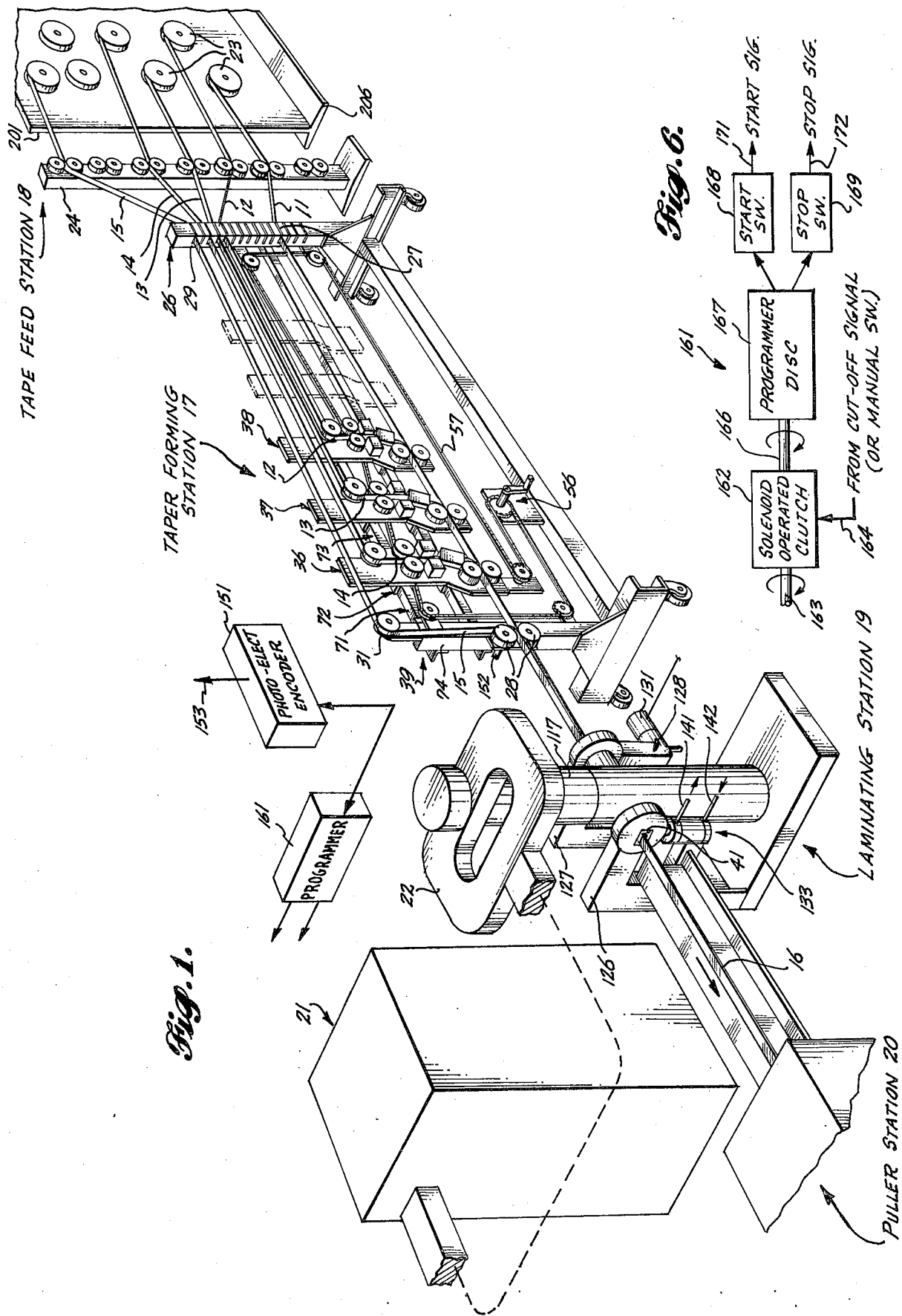
FIG. 1 is a diagrammatic perspective view of an apparatus for fabricating elongate laminated structures having repetitive longitudinal tapers, wherein the individual plies are here provided by resin impregnated fibers made up in the form of tapes.

With reference to FIG. 1, an apparatus for fabricating laminated elongate structures from continuous or substantially continuous elongated plies is illustrated in which the plies are here in the format or configuration of elongate webs or tapes 11, 12, 13, 14 and 15. Additional tapes may be added as necessary. The product resulting from the laminating process here is illustrated as a unitary elongate structural member 16. The apparatus includes a taper forming facility or station 17 which produces a plurality of longitudinal tapers on member 16 in which the cross section or thickness varies as a function of controlled application of one or more variable tapes to a continuous base or carrier tape in accordance with a predetermined longitudinally programmed pattern as described more fully herein.

The individual tapes or plies are fed to the taper forming station 17 from an upstream tape feed station 18, while the laminating process itself is carried out by a laminating station 19 located longitudinally downstream of station 17. In this particular and preferred embodiment, laminating station 19 includes a die, similar to a draw die, through which the combined tapes or other plies are drawn or pulled under substantial force applied downstream of the die. Thus, structural member 16 is substantially longitudinally continuous, and is pulled either continuously or in successive sections by a puller station 20 located downstream of laminating station 19. Additionally, means may be provided for transversely severing member 16, such as by a flying cut-off saw (not shown), whereby the otherwise continuous member 16 may be cut into desired lengths.

The longitudinal dimension of these cut lengths will typically be selected to include one or more of the repetitive tapers formed at station 17. Accordingly, it is seen that the repetitive or periodic formation of the longitudinal tapers is primarily for the purpose of efficiently producing individual lengths of longitudinal members, each having at least one taper, and in other cases having both a leading and a trailing taper. Also, it will be appreciated that some special applications will require structural members having a succession of leading and trailing tapers, in which case member 16 may be cut so as to include the desired number and character of longitudinal tapers.

The method and apparatus for forming the longitudinal tapers as disclosed herein, encompasses the formation of repetitive variations in member thicknesses or cross sections as exhibited by longitudinally spaced reinforcing pads or doublers. The fabrication of these latter structures, while not usually thought of as tapers, are nevertheless contemplated in practicing the present invention.

In this particular and preferred apparatus the present invention is embodied in a particular type of laminating system, namely a "pultruusion" system. In general, pultrusion denotes a process in which the multiple resin tapes or plies are guided into longitudinal alignment, combined and pulled through a heated die.

The die, which as indicated above is similar to a draw die, compacts the plies and forces them into the cross-sectional configuration of the die. Simultaneously therewith, heat is applied to or in the vicinity of the die to cure an adhesive substance, typically a resin, which has previously been applied to the plies. In this particular embodiment the heat applied at laminating station 19 is developed by a microwave generator 21 and communicated to the vicinity of the die by wave guides 22, in a manner more fully described herein. Although other types of heating may be employed, for this particular process, microwave heating has been found to be the most effective and economical technique. The microwave energy penetrates into the combined plies and cures the resin in time intervals typically in the range of seconds or minutes. Also, the heating tends to be more uniform than where the heat is applied primarily to the surface of the material. With this operation, the resin and resulting structure are cured during the time requried for the structural member 16 to pass through the heating zone at laminating station 19.

Although a wide variety of laminatalbe plies may be utilized with the method and apparatus of the present invention, here it is desired to produce a high-modulus structural member 16 suitable for use as a structural component of an aircraft frame. For such a use, it is desirable to provide lightweight structural members having characteristically high-modulus strain verses stress characteristics. Moreover, there is a need in such structures for members having longitudinally tapered sections. The tapered sections may result in an overall reduction in weight, as where the load on the member varies as a function of its length, or where greater and lesser flexibility are required at intermediate or opposite end portions of the elongate member. These members may vary in length from a few feet up to several hundred feet and may be employed as part of the wing structure, body structure, as empennage skin stiffeners ro curved body frames, as specially tailored beam and column members and as sophisticated spar members.

For this purpose, the starting or source materials used in the presently disclosed method and apparatus are provided by high-modulus plies or tapes 11 through 15 each made up of resin impregnated filaments of materials such as glass, graphite, boron or combinations thereof. Usually, the starting or source plies will be provided by pre-impregnated filaments or fibers, stored on supply spools or reels, however, it will be appreciated that the plies may also be coated or treated with a resin or other adhesive with an "on line" treatment station disposed upstream of the laminating station. In this embodiment, the tape plies are dispensed from a plurality of rotatably mounted tape spools 23 mounted on special, quick-disconnect mounting fixtures located at tape feed station 18, each providing an adjustable friction drag to prevent freewheeling of the tape spools, wherein this drag after once being set remains constant even though the tape ply spools are changed.

Thus, feed station 18 provides a means for receiving a multiplicity of elongate plies, in this instance wound on storage reels 23, and includes guide means, here in the form of an upstanding, multiple roller guide assembly 24 for longitudinally and in this instance laterally guiding the tape plies between reels 23 and taper forming station 17. In this instance, the tapes are guided so as to be disposed in spaced apart planes, as shown between reels 23 and station 17, such that the tapes may be guided into face-to-face contact with the lateral edges thereof in substantial alignment.

In this particular embodiment, station 17 includes further tape guide means in the form of a slotted guide post 26 for receiving the plurality of tapes from guide assembly 24 and positioning them in vertically spaced parallel planes.

Taper forming station 17 itself is provided with a base or carrier ply guide means for receiving and guiding one or more continuous or constant tape plies which pass from feed station 18 to the laminating station 19 without interruption. In this instance, a base or carrier ply tape 11 is guided uniterruptedly through station 17 between tape guide 27, here provided by a guide slot in post 26, and a pair of guide-pinch rollers 28 located at the exit end of the taper forming facility. By providing at least one constant or continuous tape, such as tape 11, a foundation for the laminated structure is provided, with respect to which one or more variable tapes may be selectively added and substracted.

In this particular embodiment, the outer plies of the finished composite laminated member 16 are both continuous or constant ply tapes, one of which is the base or carrier tape 11, while the other is provided by tape 15 and may be referred to as a cap tape. All the variable tapes are thus sandwiched in between tapes 11 and 15 to produce a relatively smooth and continuous exterior sheathing or facing on the member through the transition or tapered sections. The guide means for cap tape 15 is here provided by an upper tape guide 29 on post 26, an upper idler or guide roller 31 positioned adjacent the exit end of station 17, here vertically overlying rollers 28. Thus, tape 15 is guided by roller 31 from an overlying horizontal plane between guide 29 and roller 31 to a vertical plane which intercepts the horizontal feed plane for carrier tape 11 and merges tapes 15 and 11 at the entry side of guide-pinch rollers 28. Guide roller 31, as well as the other guide rollers, may be provided with radially protruding axial end flanges (not shown) for edge guiding of the tapes.

In addition to the constant tape or ply guides, station 17 is provided with a plurality of variable or interruptable ply guide and controller means, here embodied by variable ply guide and controllers 36, 37 and 38. Although only three such guided controllers are illustrated here, in general, any practical number of units may be utilized depending upon the desired number of variable tapes to be employed and the correlative dimensions and structural requirements of the tapers. For example, 10 or more controllers, like controllers 36–38 may be utilized to provide for selectively adding and removing as many as 10 variable plies to the ultimate structural member.

Variable ply guide and controllers 36–38 are here disposed along with rollers 28 and roller 31 on an upstanding, substantially horizontally elongate frame 39 including guide post 26. Frame 39 is substantially longitudinally alinged between tape feed station 18 and an elongate passage 41 defined in laminating station 19 through which structural member 16 is drawn. As more fully described herein, the purpose of the elongate frame 39 in this particular embodiment is to provide for selective longitudinal parameters of the taper, namely the member thickness or cross section as a function of member length.

Each of the plurality of guide and controller means here embodied by controllers 36 through 38 is disposed to individually receive one of the plurality of variable tapes, in this instance provided by tapes 12 through 14 from tape feed station 18 and to longitudinally advance such tape plies to and for engagement with carrier ply 11. For this purpose, each of the controllers is provided as described more fully herein, with a pair of feed roller means, a cutoff or cutter means, a guide chute means and a pair of guide-pinch rollers for pressing the confronting faces of the various tapes together.

In this regard it will be observed that the plies or tapes 11 through 15 are in this embodiment preimpregnated with a resin which is characteristically tacky. Thus, when any two or more of the tapes are pressed together, face-to-face, the natural tackiness or adhesiveness of the tapes tends to hold them together as a unit. This feature is utilized in the present system to successively guide the individual variable tapes into contact with carrier tape 11 or a composite of tapes including the carrier tape as a base or foundation therefor. Thus, the carrier tape 11 and thereafter in succession, each of the variable tapes 12–14 as merged or combined with the carrier tape by the controllers 36 through 38, form a composite lay-up of tapes which is longitudinally advanced toward rollers 28. At rollers 28, the continuous cap tape 15 is also pressed into adhesive contact with the previously combined tapes and from there the entire tape composite or lay-up is advanced to laminating station 19. It will be apparent that the pulling force applied to structural member 16 as it emerges from laminating station 19 is sufficient to pull all of the combined tapes by reason of the contact adhesion therebetween. In other words, a pulling force applied just to a single ply, such as carrier tape 11, will pull any one or more of the variable tapes from station 17, so long as a leading end portion of one or more of the variable tapes is pressed into face-to-face engagement with the carrier tape or with another of variable tape already joined to the carrier tape.

The cutoff means and driven feed roller means of each of controllers 36 through 38 provide for selective commencement and termination of the variable tapes with respect to the composite laminating structure. More particularly, these variable tapes are selectively interrupted in a sequence, either determined by the physical separation of controllers 36 through 38, or a time sequential operation of the cutoff means and feed roller means thereof, so that the variable tapes commence at longitudinally spaced increments or steps to form a leading taper, i.e., a taper which increases in cross-sectional thickness as the structure is advanced through the processing stages, and to terminate the individual variable plies at successively increasing positions or steps of longitudinal advancement of the carrier tape to form a trailing taper. Repetition of the established commencement and termination sequence serves to continuously generate a laminated structure 16 which has the desired longlitudinally repetitive taper or variable cross section pattern.

When the taper forming apparatus embodied by station 17 is employed with a pultrusion process, as in the presently disclosed and preferred form of the invention, it is preferable to provide means at laminating station 19 cooperating with the functioning of taper forming station 17, to vary the cross-sectional opening of the pultrusion die at station 19 to accommodate the varying cross section of the composite elongate structure. As more fully described herein, this is provided by control method and apparatus monitoring the longitudinal advancement of the taper or transitional sections of the tape and signaling die opening and closing means to adjust the cross-sectional opening of the die in accordance with the instantaneous cross-sectional dimension of the composite tapes. Thus, for sections of the tape having relatively few or no variable tapes, the die cross section at station 19 will be disposed at a minimum cross-sectional opening. As a leading taper approaches the station, the above-mentioned control means will signal the laminating station 19 to begin opening the die cross section, which opening may take place in incremental amounts correlated to the increasing cross section of the composite structure through the transition or tapered section. Thereafter, as a trailing taper enters the laminating station 19, an incrementally changing closure of the variable die opening takes place, returning the die to its original state of minimal opening or cross section.

On the other hand, some applications of the invention may not require a critical control over the die opening, and the die may be set to an average dimension which will accommodate the various transitional cross sections of the composite structural member. Still another embodiment of the invention may provide for a floating die opening, in which a constant compressive force tends to urge the die closed, yet the cross-sectional opening therein will contract and expand as necessary to accommodate varying cross-sectional dimensions of the combined plies.

TAPER FORMING STATION

Figure 2:
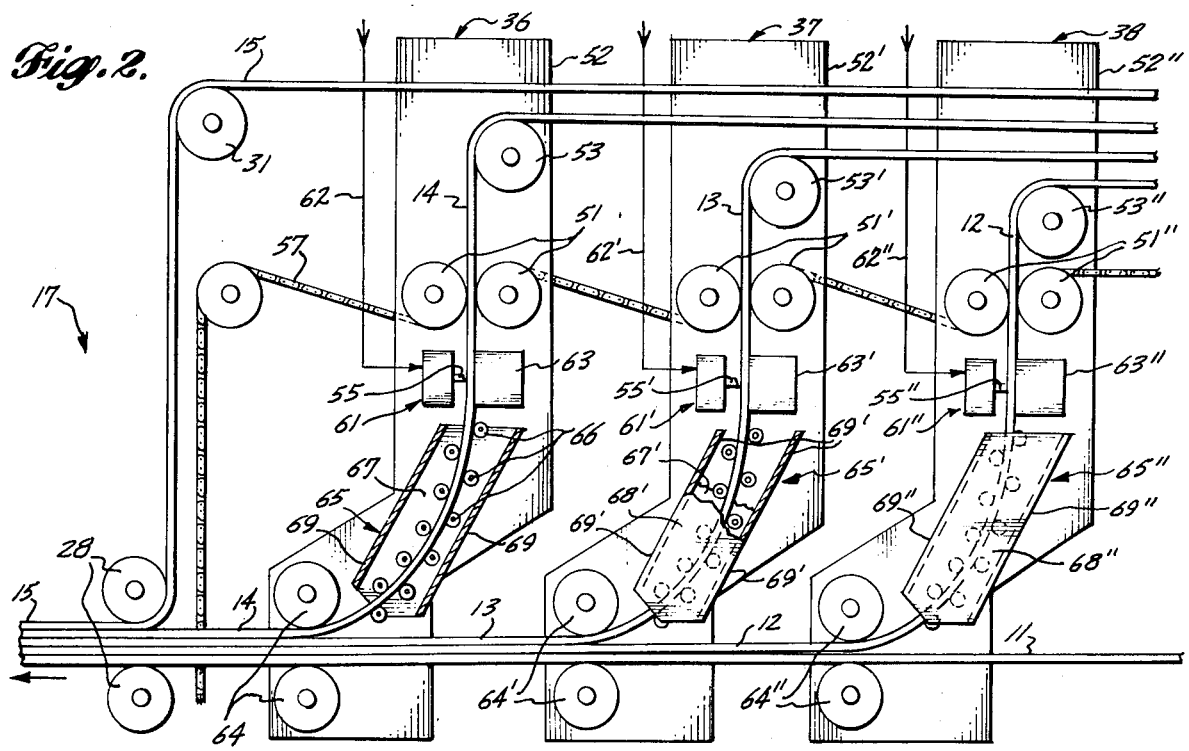
FIG. 2 is a diagrammatic elevational view of the principal components of a taper forming or fabricating station disposed between the tape feed facility and the laminating station of FIG. 1.

With reference to both FIGS. 1 and 2, each of the plurality of variable ply guide and controllers 36 through 38 herein, provide for repetitively removing and adding the variable tapes such that as the structural member 16 is pulled through the laminating station 19, its cross section or thickness varies as a function of its longitudinal dimension. As will be seen more fully herein, the various controllers of taper forming station 17 may be operated so as to produce longitudinal tapers of uniform or constant slope both at the leading and trailing tapers, which are called constant step tapers. Alternatively, variable tapers may be generated, in which the thickness of cross-sectional dimension of the composite structure varies nonlinearly as a function of length, which are called variable step tapers. As indicated above, the method and apparatus of the present invention may be employed, in general, to produce any desired cross-sectional variation in longitudinally laminated members in which the cross section varies in accordance with a predetermined longitudinally repetitive pattern. Thus, structures having the above-mentioned constant and variable tapers, as well as structure having reinforcing pads, doublers, etc., may be fabricated.

As illustrated by controller 36, each variable ply guide and controller means is in this embodiment provided with a pair of selectively driven counter rotating feed rollers 51 mounted on a vertically oriented, elongate, plate-like support 52. Rollers 51, which may be provided with elastomer faces for frictionally gripping the tape, serve as a means for receiving an associated variable ply, in this instance tape 14, and on command, advancing such tape ply into contact with the carrier tape, or if other tapes have already been added to the carrier tape, then into contact with the composite of tapes already formed. An idler or guide roller 53 is also rotatably mounted on support 52 to assist in guiding variable ply tape 14, in this instance from its horizontal plane established by roller 53 and guide post 26 into a vertical guide plane passing between rollers 51 as illustrated.

Similarly, each of the remaining variable ply guide and controllers 37 and 38 as shown in FIG. 2 are provided with corresponding components indicated by the single primed reference numerals for controller 37 and the double primed reference numerals for controller 38. It will be observed that guide rollers 53' and 53'' have been disposed at increasingly lower elevations on supports 52' and 52'' relative to the preceeding roller component in order to provide the vertical spacing between the horizontal guide planes of the variable tapes, and to position controllers 36 through 38 at locations inside or between the guide planes of a preceding variable tape and carrier tape 11. Thus, controller 36 positions variable tape 14 inside or between the guide planes of guide tape 15 which may be joined to the composite tape at a point advanced from or preceeding the combined point of tape 14. Similarly, variable ply or tape 13 is inside the guide planes of variable tape 14 and the composite tapes placed on carrier tape 11, while variable tape 12 is disposed by controller 38 in between the guide planes of variable tape 13 and carrier tape 11.

Feed rollers 51, 51' and 51'' are selectively operated to initiate a leading taper. In this particular embodiment, these feed rollers are selectively rotatably driven by a manually operated crank 56 and a cooperating, elongate continuous loop drive member, in this instance provided by drive chain 57, coacting with sprocket wheels (not shown) coaxially associated with each pair of feed rollers. While other rotatably driving devices may be utilized as described herein, in general means such as crank 56, chain 57 and the cooperating roller sprocket wheels provide controllable motive means for selectively rotatably driving feed rollers 51, 51' and 51'' to advance the associated tape plies downwardly from guide rollers 53, 53' and 53'' into adhesive contact with the other variable and continuous tapes.

Each of the plurality of controllers is further provided with a controllable tape or ply cutoff means, here in the form of a solenoid operated cutoff blade assembly 61 for controller 36, and with like assemblies 61' and 61'' for controllers 37 and 38. Thus, each of assemblies 61, 61' and 61'' is responsive to an electrical control signal received over control lines 62, 62' and 62'' to electromechanically drive a cutoff blade or knife to sever the associated tape or ply transversely to its guide path adjacent the respective cutter. More particularly, each of the cutoff assemblies is disposed at a location on the associated supports 52, 52' and 52'' adjacent and downstream of feed rollers 51, 51' and 51'' such that the severed portion of the tape associated with the supply or feed station 18 is maintained in drivable, engaged relation with the feed roller. Thus, upon commencement of the succeeding, leading taper, the feed rollers 51, 51' and 51'' may be selectively driven to automatically feed the variable supply tapes into position, without requiring rethreading or other manual preparation.

The cutoff assembly may be provided by any suitable, well-known electromechanical device. In this instance a steel rule knife section or blade 55 is mounted on a lever arm which is pivotally mounted on a point fixed on assembly 61 and support 52. The opposite end of the arm is connected to a pull solenoid, which upon energization, drives the blade through the tape ply and against a backing block or member 63.

Mounted in tape end receiving relationship, on each of supports 52, 52' and 52'', are guide-pinch rollers 64, 64' and 64'', which are adapted to receive the severed end of each variable tape as it is added to the remaining tapes during a lay-up or formation of a leading taper. The severed tape end corresponds to that end of the section originating from from feed station 18.

More particularly, guide-pinch rollers 64, 64' and 64'' are constructed so as to laterally guide and transversely compress the plurality of tapes into adhesive contact prior to being fed into the laminating station 19. In this respect, rollers 64, 64' and 64'' serve a similar function to guide-pinch rollers 28 discussed above. Each of these sets of counter-rotating guide and pinch rollers 28, 64, 64' and 64'' is preferably constructed so as to apply a predetermined compaction or compression force on the outer or remote faces of the outermost tape layers so as to cause the desired adhesion between the various plies. For this purpose, the rotational axis of one of each pair of rollers 28, 64, 64' and 64" is preferably fixed or stationary, while the complementary roller is movable under a spring biasing force toward the fixed axis roller along a line generally transverse to the path of the combined tapes.

Thus, this particular embodiment, the upper one of the pairs of rollers 28, 64, 64' and 64" may be mounted on a fixed axis of rotation, while the other and lower roller is movable in a vertical plane toward and away from the upper roller, and under a spring bias tending to continuously urge the lower roller upwardly into engagement with the upper complimentary roller to apply the desired compression force on the tapes. As the thickness or cross section of the combined tapes varies by reason of the addition or subtraction of the variable plies, the springloaded pinch rollers 28, 64, 64' and 64" responsively open or close to accommodate the changing thickness. Since each set of pinch rollers 28, 64, 64' and 64" serves to merge or combine another tape to the foundation or carrier tape 11, these rollers are disposed in longitudinal alignment with the guide path of carrier tape 11 so that the carrier tape passes through each set of rollers, while each variable tape or ply is guided through the set of rollers associated with its controller, and all of the sets of pinch rollers downstream therefrom.

To automatically guide or thread a severed tape end from each of the cutoff assemblies to the upstream or feed side of the pinch rollers 64, 64' and 64", each of controllers 36 through 38 is provided with a guide chute means for receiving the cutoff tape end as it is advanced by feed rollers 51, 51' and 51" and guiding it into the entry angle defined by the guide-pinch rollers 64, 64' and 64". In this embodiment, the guide chute means is provided by a plurality of rollers 66 faced with polytetrafluoroethylene, e.g., Teflon (trademark) and a product of E. I. DuPont de Nemours, Inc., Wilmington, Delaware, with such rollers having their axes extending substantially parallel to the planar faces of the tape and substantially transversely to the tape's longitudinal dimension, rotatably mounted to support 52. By locating rollers 66 in opposed confronting relationship to the major faces of tape 14 and in a curvilinear pattern between cutoff assembly 61 and rollers 64 as ilustrated, a predetermined curvilinear guide chute path is established, which in this instance extends downwardly and forwardly, i.e., in the direction of advancement of carrier tape 11, of cutoff assembly 61 and feed rollers 51, to guide the severed end of the variable tape into the feed side of rollers 64 at a substantially acute angle with respect to carrier tape 11. It will be appreciated that with reference to FIG. 2, showing an operating condition of station 17 in which all of the variable tapes 12 through 14 are being added to carrier tape 11, that tape 14 is being laid by roller 64 on top of a composite of previously laid variable tapes 13 and 12, and carrier tape 11. As will be seen herein, during the commencement of a leading taper, at least with respect to constant slope tapers formed by the apparatus constructed in accordance with FIG. 2, that the leading end of variable tape 14 will be the first variable tape to contact carrier 11, and that in such case, guide chute 65 disposes the end of tape 14 at the proper angle for causing roller 64 to pinch and thus press it into contact with tape 11.

Each of guide chutes 65, 65' and 65" is provided with lateral side plates or guide walls 67' and 68' as best shown for guide chute 65' in FIG. 2. Guide wall 67' is disposed adjacent and parallel to support 52' while lateral guide wall 68' is disposed parallel to support 52' but spaced outwardly therefrom by spacer walls 69'. The confronting faces of walls 67' and 68' may be lined with polytetrafluoroethylene, like the facing on rollers 66', so as to provide low friction surfaces along which the end, edges and faces of the guided tape may slide while being advanced by the upstream feed rollers. Thus, it will be observed that the feed rollers 51, 51' and 51" cooperate with guide chutes 65, 65' and 65" to initiate a leading taper or other step increase in the thickness of the laminated structure by selectively advancing the previously severed variable tapes into contact adhesion with one or more other tapes including carrier tape 11.

In general, the plurality of variable ply guide and controller means, here embodied by controllers 36 through 38 provide for selectively longitudinally advancing any one or more of the variable tape plies into longitudinal engagement with the carrier ply 11, for forming longitudinally repetitive cross-sectional variations, such as tapers, in the resulting laminated structure. The preferred embodiment of the invention as shown in FIGS. 1 and 2, provides for the formation of longitudinal tapers in the composite structure by spatially locating controllers 36 through 38 at different, effective, longitudinal positions relative to the longitudinal advancement of the foundation or carrier tape 11, and operating in succession, first the cutoff means and thereafter the feed roller means of the controllers. More particularly, the cutoff means, here provided by cutoff assemblies 61, 61' and 61" are simultaneously energized over control lines 62, 62' and 62", for fabricating a trailing taper, in which the slope of the taper is determined by the longitudinal separation of controllers 36 through 38. This is achieved here by constructing controllers 36 through 38 such that each of the cutter assemblies 61, 61' and 61" are disposed at equal transverse distances from the guide path of carrier tape 11. As such, when all of the variable tapes are cut or severed simultaneously, the effective longitudinal spacing between each of the severed ends on the resulting laminated member, will be the same as the longitudinal distance between each of the cutoff means, i.e., the distance between cutter assemblies 61, 61' and 61" projected onto carrier tape 11 along imaginary projection lines transverse to the longitudinal dimension thereof.

Similarly, when initiating a leading taper, the previously severed ends of the variable tapes, are initially located at the knife edge of the cutter assemblies, such that simultaneous, joint, equal rotation of feed rollers 51, 51' and 51", results in a lay-up of these tapes having a reversed order of commencement from a trailing taper, and having an increasing slope equal to the decreasing slope of the trailing taper, by reason of the same longitudinal spacing between the tape ends with respect to carrier tape 11.

It will be observed that this correlation between leading and trailing tapers is only valid so long as a constant taper, that is a taper formed with equal step distances or intervals between each of the leading ends, and between each of the trailing ends. As described in connection with FIG. 3, hereinafter, a modified procedure may be employed to fabricate variable slope tapers, in which the variable plies are commenced and terminated at relatively different longitudinal intervals.

With respect to the operation of taper forming station 17 as shown in FIGS. 1 and 2, the initial taper of a pattern of repetitive tapers may commence with either a leading or trailing taper. To illustrate the operation, it will be assumed that station 17 as shown in FIG. 2 is in an operating state between a leading and trailing taper, and that the plurality of variable ply guide and controller means, namely controllers 36 through 38, are to be operated to produce the next, successive trailing taper. It will be observed that in this state, all of the variable plies 12 through 14 are applied or added to the composite or tape lay-up, such that the resulting laminated structural member 16 as shown in FIG. 1 will be of maximum thickness for this particular setup.

To condition station 17 for fabricating or forming a trailing taper, in this particular instance, all of the cutter means or cutoff assemblies 61, 61' and 61'' are simultaneously energized over their respective control lines 62, 62' and 62''. After severance, the same adhesive contact or engagement of the various tape plies which allows the tapes to be pulled or withdrawn from tape feed station 18, continues to withdrawn the now severed, free end sections of the variable tapers 12, 13 and 14 downwardly from cutoff assemblies 61, 61' and 61'' through chutes 65, 65' and 65''. Spring loaded pinch rollers 64, 64' and 64'' receive and seal the severed tape end to the composite tape lay-up. Moreover, the respective severed ends reach the pinch rollers 64, 64' and 64'' simultaneously, such that the ends are sealed to foundation carrier tape 11 at the same time. Since all of the cutter assemblies 61, 61' and 61'' of controllers 36, 37 and 38 respectively, are at equal transverse distances from the guide path of carrier tape 11, the severed tape ends are automatically disposed at increasing longitudinal intervals or steps on carrier tape 11, corresponding to the distance between the various cutoff assemblies along the longitudinal dimension of the carrier tape guide path. Continued longitudinal advancement of structural member 16 as shown in FIG. 1 pulls the trailing taper through guide-pinch rollers 28 and through laminating station 19. The cross section or thickness of member 16 is now reduced to the continuous plies, here provided by carrier tape 11 and cap tape 15.

During the formation of the trailing taper, feed rollers 51, 51' and 51'' are in a nondriven or unenergized condition, such that upon severance of the variable ply tapes by cutter assemblies 61, 61' and 61'' the severed ends of these tapes associated with the upstream supply side of the system, remain stationary at the point of severance, i.e., in registration with the severing blade. These tapes are thus now in position for being advanced by feed rollers 51, 51' and 51'' to form a leading taper.

In this embodiment, the leading taper is initiated by simultaneously motivating or rotatably driving feed rollers 51, 51' and 51'' by means of rotating manual crank 56 as shown in FIG. 1 to advance drive chain 57. With chain 57 jointly connected in drive relationship to each of the feed rollers of controllers 36 through 38, this results in all of the variable tapes being advanced downwardly through guide chutes 65, 65' and 65'' toward and into contact with the carrier tape path as described above.

Once the leading ends of the variable tapes are forced into contact with carrier tape 11 or one of the other variable tapes, then the tackiness of the resin, holds the tape in its established longitudinal relationship with the other tapes, while the entire composite is pulled through the laminating station. Energization of feed rollers 51, 51' and 51'' is only required for advancing these tapes between the cutoff or severance point at assemblies 61, 61' and 61'' and the point at which these tapes are combined with the other tapes by guide-pinch rollers 64, 64' and 64''. Thereafter, the longitudinal advancement of the variable tapes is by reason of the longitudinal pull force on structural member 16, rather than the push or feed force developed by rollers 51, 51' and 51''.

For this purpose, an over-running clutch may be employed in driving relationship between drive chain 57 and the rollers 51, 51' and 51'', so that the manual crank drive 56 may be used only to commence the leading taper, with the feed rollers thereafter assuming a freewheeling condition in which they are disengaged from chain 57 and manual crank 56. Also, the over-running clutch facilitates the use of station 17 for forming variable slope tapers in a manner discussed more fully herein in connection with FIG. 3.

The longitudinal dimension between the trailing end of the last variable ply to be removed and the leading end of the first variable ply to be added is determined by the amount of longitudinal travel of carrier tape 11 occurring between the actuation of cutoff assemblies 61, 61' and 61'' and the time at which feed rollers 51, 51' and 51'' are rotatably driven to advance the variable tapes into contact with the carrier tape. If a uniform longitudinal rate of advancement of carrier tape 11 and structural member 16 exists, then this distance dimension between tapers can be set by merely selecting the time intervals between successive operations of the cutoff assemblies and feed rollers of controllers 36 through 38. If, on the other hand, tape 11 advances at a variable rate, or is intermittently advanced toward laminating station 19, then the sequence of operation for cutoff assembly 61, 61' and 61'' and feed rollers 51, 51' and 51'' are to be correlated to the longitudinal position of carrier tape 11.

Similarly, the longitudinal distance of the maximum thickness portion between the leading end of the last applied tape of a leading taper and the trailing end of the first removed tape of a trailing taper, is determined by either the timed or measured longitudinal advancement of carrier tape 11.

The longitudinal distance between each end of the variable tapes during a taper transition, may be referred to as the "step" distance and is set by either of two means. First, as in the present and preferred embodiment, the means for setting this "step" distance is by selecting the longitudinal spacing between the plurality of controllers 36, 37 and 38.

More particularly, the plurality of ply guide and controllers 36 through 38 are each movably mounted on a horizontally extending track, here provided by an elongate member 71 extending between guide post 26 and post 74 of frame 39 as shown in FIG. 1. Roller bearings or other slidable mounting means, such as indicated at 72 for controller 36, are provided for movably supporting each of the controller supports 52, 52' and 52'' on a track surface 73 of member 71 extending horizontally and parallel to the longitudinal guide path established for the various tapes passing through station 17.

By this means, the plurality of controllers may be individually positioned at predetermined longitudinal intervals along the horizontal guide path of carrier tape 11 as it extends between posts 26 and 74 of frame 39.

Suitable, releasable locking means (not shown) may be provided for locking support 52, 52' and 52'' at selected longitudinal locations on member 71, such that the selected positions of the controllers remain fixed during the operation of the system.

By allowing for the spatial positioning of controllers 36, 37 and 38, in this instance along the length of carrier tape 11, adjustable means are provided for setting the desired "step" increment of the fabricated tapers. A relatively small or short "step" distance defining a rapidly increasing and descreasing taper, may be established by positioning controllers 36, 37 and 38 with a minimal or zero longitudinal spacing. In this instance the longitudinal spacing on track 72 of member 71 is limited only by the width of the controller supports 52, 52' and 52''. On the other hand, a relatively slowly changing taper, corresponding to relatively greater "step" distances between the variable tape ends may be fabricated by increasing the longitudinal separation of controllers 36, 37 and 38.

Thus it will be seen that the means for selectively operating the variable ply guide and controllers 36, 37 and 38 so as to terminate and commence the variable tape plies is here in part provided by the movability of each of the controller supports on frame 39. As an alternative embodiment of the method and apparatus in accordance with the present invention, this selective operation of the various controllers may be achieved by operating the respective cutoff means and tape feed means at different, predetermined sequential times.

For example, with reference to FIGS. 1 and 2, without repositioning the longitudinal location of controllers 36, 37 and 38, a trailing taper may be generated by energizing cutoff control lines 62, 62' and 62'' at different time intervals, selected in accordance with a predetermined timing sequence. Such a timing sequence will produce a trailing taper having "step" distances between the severed tape ends equal to the horizontal spacing between the controllers and plus the amount of tape travel attributed to the time differences at which of lines 62, 62' and 62'' are energized. By selectively, and successively delaying the application of the cutoff signal to each control line, starting with line 62 and proceeding to lines 62' and 62'', a trailing taper will be produced having "step" distances which would be the equivalent of increasing the longitudinal spacing between controller supports 52, 52' and 52'' on frame 39 and simultaneously energizing the cutoff control lines.

Similarly, time sequencing of the operation of feed rollers 51, 51' and 51'' may be employed to produce a leading taper having the desired "step" distances, wherein such distances are not solely determined by the horizontal or longitudinal spacing between the controllers. In such case, it may be desirable to drive feed rollers 51, 51' and 51'' by automatically controlled servomotors responsive to a preprogrammed sequence of timing signals. Similarly, the signals energizing cutoff assemblies 61, 61' and 61'' may be generated automatically in accordance with the desired timing sequence. It will be appreciated that the sequencing of the cutoff means and the feed roller means permits controllers 36, 37 and 38 to be mounted at any suitable spatial orientation relative to carrier tape 11, without being limited to the equal transverse spacing of cutter assemblies 61, 61' and 61'' with respect to the guide path of tape 11. Moreover, the dimensions of the generated tapers would in such case not be limited to the physical length of frame 39, as in the case of the above described embodiment wherein the "step" distances are determined by the allowable horizontal spacing achieved between controllers 36, 37 and 38.

As indicated above, the use of taper forming station 17 in which the longitudinal tapers are formed by setting the spacing between variable ply controllers 36, 37 and 38, is best suited for constant tapers, having equal "step" intervals. If variable "step" intervals are used for the repetitive tapers, requiring unequal spacing between controllers 36, 37 and 38, then it will be appreciated that a trailing taper produced by simultaneous actuation of the cutoff means, and a leading taper produced by joint simultaneous rotation of the feed roller means, will produce characteristically different slope tapers at the leading and trailing transitions. This is because of the reversal in order between the termination of the tapes for a trailing taper versus the commencement of the variable tapes for a leading taper.

In order to produce matched leading and trailing tapers of a variable slope or varible "step" transition, a programmed time sequencing of the cutoff means and feed roller means associated with controllers 36 through 38 may be employed as discussed above, with the timing selected to produce different "step" intervals for the leading taper as contrasted with the trailing taper. In other words the timing or sequencing of the controllers is selected to compensate for the fact that the tapers are laid for a leading taper in an order that is reversed from that of the termination of the variable tapes.

Alternatively, the apparatus diagrammatically illustrated in FIG. 3 may be employed to produce variable "step" tapers in repetitive longitudinal patterns. Basically, the apparatus of FIG. 3 may utilize taper forming station 17 as shown in FIG. 1, with the addition of detachable or fixedly mounted individual hand cranks 81, 81' and 81'' for individually rotatably driving feed rollers 82, 82' and 82'', corresponding to feed rollers 51, 51' and 51'' of FIGS. 1 and 2. In practice, the same station 17 may be utilized, with feed rollers 82, 82' and 82'' being coupled to the manually cranked, chain drive assembly of FIGS. 1 and 2 through the above described over-running clutch. Thus, the feed rollers of FIG. 3 may be individually driven by cranks 81, 81' and 81'' without disconnecting the chain drive coupling, which may be used for forming the constant slope tapers.

Figure 3A:
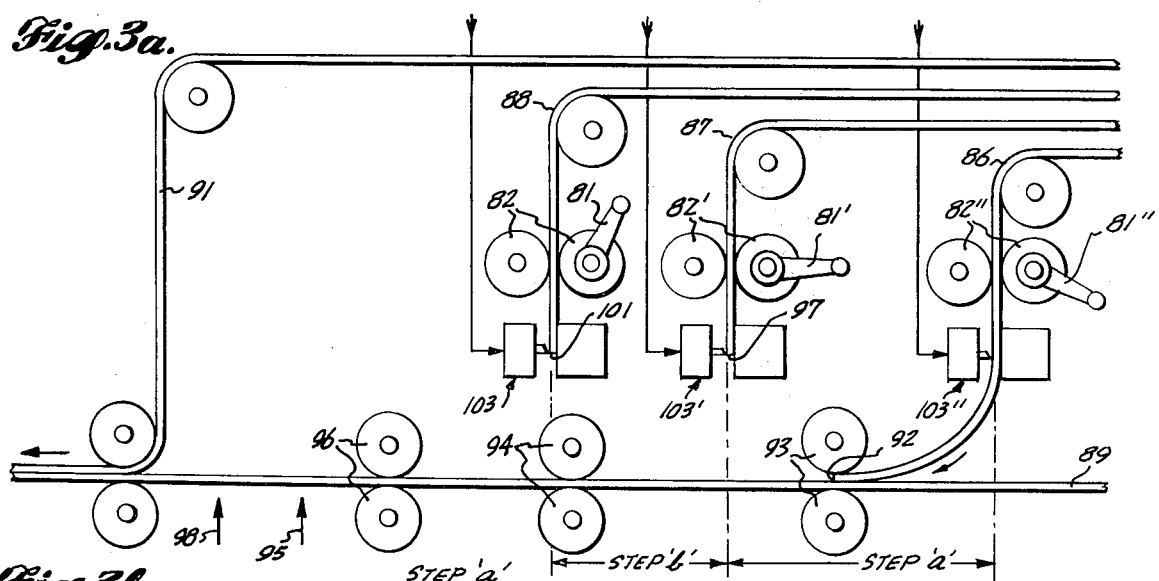
FIGS. 3a, 3b and 3c are diagrammatic elevational views showing successive operational stages of an alternative embodiment of the taper forming station of FIG. 2.
Figure 3B:
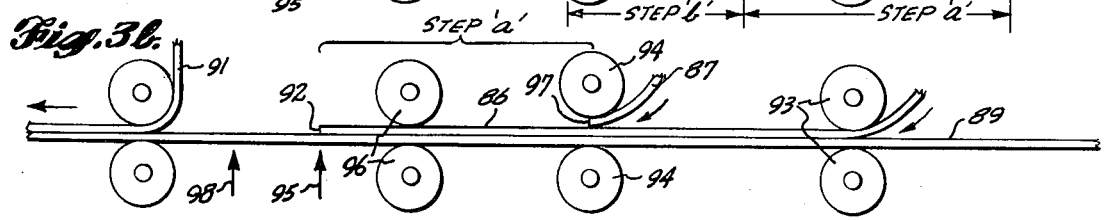
Figure 3C:
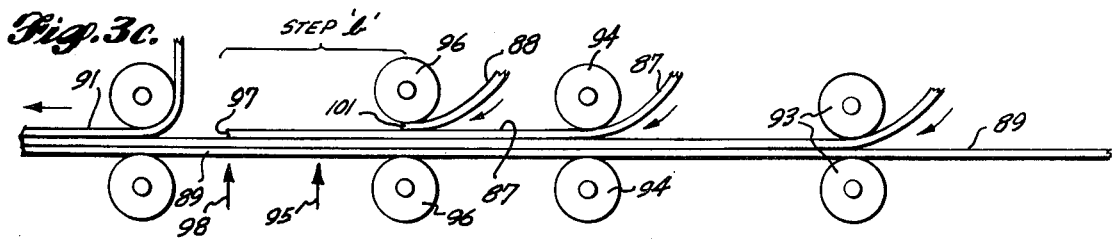

The sequence of operation for fabricating a variable slope, or "step" taper is shown in FIGS. 3a, 3b and 3c. In this case, a set of three variable tapes 86, 87 and 88 are combined with a constant carrier tape 89 and a constant cap tape 91 as indicated. To initiate a leading taper, feed rollers 82'' associated with the controller for variable tape 86 are manually rotated by crank 81'' to advance a leading end 92 of variable tape 86 into contact with carrier tape 89 as illustrated.

As discussed above in connection with the embodiments of FIGS. 1 and 2, as soon as the leading end of a variable tape is forced into engagement with the carrier tape, the adhesiveness or tack of the resin causes an immediate, contact adherence between the tapes such that the composite is drawn or pulled along by the pull force applied to the carrier tape at a location downstream of the laminating station.

To establish the first step interval or distance, in this case indicated by step *a* of the variable step taper, tapes 92 and 89 are allowed to advance longitudinally of the apparatus, passing through guide-pinch rollers 94 associated with the controller for tape 87 and through guide-pinch rollers 96 of controller for tape 88, until tape end 92 comes into registration with a pre-established longitudinal index or marker 95 which may be one of several indicators slidably mounted on a longitudinally extending, ruled track or the like (not shown) mounted on a frame, such as frame 39 of taper forming station 17, parallel the to the carrier tape guide path.

Marker 95 coacts with tape end 92 to set the length or distance of step *a* corresponding to the first step of the leading taper. For this purpose marker 95 is located by placing it longitudinally in advance of a centerline of rollers 94 by an amount equal to the length of step *a* corresponding to the last step of a trailing taper which in turn is established by the longitudinal spacing or separation between the cutters 103′ and 103″ for variable tapes 87 and 86.

When tape end 92 reaches marker 95, the next variable tape layer is commenced by operating feed rollers 82′ by manual crank 81′ to feed variable tape 87 and its leading end 97 downwardly into contact with variable tape 86 at the feed or upstream side of pinch rollers 94. It will be observed at this point, that the distance between tape ends 92 and 97 now corresponds to the proper, step *a* interval. The combined tapes 86, 87 and 89 are noiw advanced longitudinally under the pull force applied downstream, until tape end 97 advances to a point registration with a second marker 98 provided by a similarly, slidably mounted indicator as in the case of marker 95. Marker 98 is located in advance of pinch rollers 96 by a distance equaling step *b* as shown in FIG. 3c to provide the proper spacing between tape end 97 of tape 87, and an end 101 of the last variable tape 88 to be combined. In this manner it will be observed that the leading taper exhibits the same, corresponding step variation between ends 92, 97 and 101 as will result from the simultaneous energization of cutter assemblies 103, 103′ and 103″.

To change the dimensions of the steps for a variable taper, it is merely necessary to change the longitudinal separation or spacing between each of the controller supports, as discussed above in connection with FIG. 2, and thereafter set the markers 95 and 98 in accordance with the established controller spacing.

LAMINATING STATION

In the presently described and preferred embodiment of the method and apparatus in accordance with the present invention, laminating station 19 is equipped with a pultrusion die 105 as best shown in FIG. 4. Die 105 is a relatively elongate structure, defining an internal, similarly elongate opening 108 as indicated in FIG. 5, through which the plurality of tape plies are pulled under substantial force to compact and thus assist in the laminating process. As described more fully herein, the die is in this instance formed of two parts or sections 106 and 107 so as to provide a variable or controllable cross section for opening 108 to accommodate the variable thickness or cross section of the plurality of combined tapes, resulting from the taper transitions.

Die 105 may be formed of a material having sufficient strength and surface smoothness under elevated temperatures, to perform the extrusion-like processing of the tapes as they are pulled through the die opening. For a pultrusion process capable of fabricating high-modulus laminated structures as above described, a material such as alumina ($Al_2O_3$) may be used, and more particularly composites thereof having characteristics of strength, hardness and smoothness are suitable. Materials having approximately 85 to 99,9% alumina, and available from Carborundum Company of Latrobe, Pennsylvania; Ceram Corporation of El Cajon, California; and Coors Porcelain Company of Golden, Colorado, have been found satisfactory.

Additionally, for this particular embodiment, and preferably for pultrusion systems of this type, the die material must be transmissive to the microwave energy applied to the tapes as they are passed through the die opening 108. Alumina is a material transmissive to the microwave energy. Other materials which may be used for the die, include ceramics and in some cases polytetrafluoroethylene, e.g. Teflon, (trademark), a product of E. I. DuPont de Nemours, Inc., Wilmington, Delaware.

In order to provide for the controllable or variable transverse dimension of die opening 108, die 105 is formed herein of complementary elongate die sections, provided by a male die section 106 and a female die section 107 defining a cross section for the die opening having a variable spacing 112 between die faces 109 and 111 which is variable in the dimension corresponding to the variable thickness of the laminated tape plies.

For this purpose, sections 106 and 107 of die 105 are mounted in station 19 so as to extend between a forward, entry end 114 and a rear, exit end 116 transversely through a hollow cylindrical microwave guide section 17 vertically oriented at station 19. A pair of quarter wave chokes 118 and 119 coaxially surround and extend outwardly from openings 121 and 122 in hollow cylindrical section 117 to accommodate the extension of die 105 therethrough. The microwave energy is fed from generator 21 through wave guide 22 into the vertically oriented wave guide section 117, whereupon the energy passes through the ceramic material of the die to elevate the temperatures of the tape ply to a desired range. As an example, the curing or treatment temperature may be in the range of several hundred degrees Fahrenheit.

The slip surfaces of the die, corresponding to the interior faces of die opening 108, including faces 109 and 111, may be treated with a lubricant to reduce the amount of friction generated between the pulled tape plies and the die, or in the alternative, a low friction slip tape may be prewrapped around the composite plies to provide the desired lubrication as disclosed in my copending application Ser. No. 578,879 entitled "METHOD AND APPARATUS FOR APPLYING ANTI-FRICTION SHEATHING TO ELONGATE PLIES IN A PULTRUSION LAMINATING SYSTEM" filed May 19, 1975.

The variable, controlled spacing 112 of die opening 108 is preferably provided by apparatus which affords a difference in the die spacing 112, as a function of the die length, in order to accommodate the longitudinal tapers of the incoming tape composite. In other words, some relative tilting or nonparallelism between die sections 106 and 107 should be permitted in order to mate with the slope of the fabricated tapers.

For this purpose, die section 106 is here fixedly mounted in a substantially horizontal plane, by mounting supports 123 and 124 carried by arms 126 and 127 respectively, mounted at station 19 as shown in FIGS. 1 and 4. The complementary, and in this instance underlying die section 107 is mounted on supports which are movable in the vertical plane, and in this instance include a jackscrew assembly 128 connected to a lower, forward end 129 of die section 107 for selectively locating die 107 adjacent end 129 relative to fixed die section 106 along an axis of movement perpendicular to faces 109 and 111. Jackscrew assembly 128 is in turn controlled by a stepping motor 131 cooperatively connected thereto for producing the desired positioning of end 129 of die section 107.

Jackscrew assembly 128 and stepping motor 131, which is in turn responsive to a controller 132, the function of which is described more fully herein, affords an automatic control over the dimension of spacing 112 adjacent the entry 114 of die 105. The discharge or exit end 116 of die 105 is provided with a floating, adjustable air spring assembly 133 connected to an end 134 of the movable die section 107 to produce an adjustable, relatively constant pressure load or force urging section 107 toward section 106 at end 116. By thus loading die section 107 adjacent its discharge or exit end the spacing 112 of die opening 108 is free to float under a predetermined pressure against the varying cross section of the longitudinally advancing tape plies. Air spring assembly 133 ensures a predetermined minimum of compressive die pressure to which the laminated parts are subjected, as the tape plies are drawn through the rearwardmost portions of die 105. Air spring assembly 133 and jackscrew assembly 128 and stepping motor 131 may be carried by arms 126 and 127, with connecting members 136 and 137 coupling these assemblies respectively to the lower rear and forward end portions 134 and 129 of movable die section 107.

An adjustable air pressure control including a four-way valve 139 having output conduits 141 and 142 connected to opposite end chambers of air cylinder assembly 133, and including an input 143 connected to a flow control 144, regulator 146, valve 147 and air supply 148, and having an output 149 providing an exhaust to atmospheric air. These components provide for controlling air spring assembly 133 to produce a predetermined amount of force on end 134 of die section 107 in a direction perpendicular to internal die face 111.

While the exit end of die 105 is thus free floating, and automatically responsive to the thickness or cross section of the advancing tape plies, the spacing 112 at entry end 114 of the die sections is preferably under the positive positional control of screwjack assembly 128 and stepping motor 131. Moreover, these latter components are in turn preferably automatically controlled by a controller 132 which is responsive in a repetitive pattern to the re-occurring leading and trailing tapers of the tape composite as formed by station 17. In other words, it is desirable to adjust the cross section of opening 108 between face 109 and 111 to a minimal amount for compressing a composite tape lay-up in which all the variable tapes have been removed, and increasing the die opening spacing 112 to a predetermined maximum amount for accommodating a maximum cross section of the tape lay-up in which all of the variable tapes have been added. Furthermore, this is accomplished in accordance with the preferred method and apparatus of the invention by providing a stepwise change or transition in spacing 112 as the taper transitions pass through entry 114 into die 105. For increasing or leading tapers, this results in a stepwise incremental increase in spacing 112 as a function of longitudinal advancement of the tape plies, whereas for decreasing or trailing tapers, a stepwise decreasing spacing of die opening 108 is provided.

To coordinate the variable opening of die 105 with the longitudinally advancing repetitive taper pattern generated by die forming station 17, means are provided for generating an electrical train or stream of pulses having a frequency or rate equaling the longitudinal rate of advancement of the composite tapes as they leave taper forming station 17. The train of pulses is in turn applied to controller 132 which responsively issues a stepping signal to stepping motor 131 after receiving a predetermined number of such pulses, representing a predetermined longitudinal travel of the tape plies. Moreover, the controller 132 may be coordinated with "start" and "stop" signals generated in response to the instantaneous location of a taper forming by station 17 and advacing toward laminating station 19. Similarly, a taper direction signal may be generated and applied to controller 132, to signal the controller of an approaching leading taper, or trailing taper, in order to automatically condition the controller to cause stepping motor 131 to step in the proper direction for increasing or decreasing spacing 112 at die entry 114.

More particularly, with reference to FIG. 1, means for producing the stream of pulses correlated to the longitudinal advancement of the tapes, is in this instance provided by a photoelectric encoder 151. Encoder 151 may be an electro-optical apparatus mechanically coupled to a rotating shaft 152 of pinch rollers 28 at station 17 to produce an electrical pulse signal for each predetermined increment or interval of actual longitudinal travel of the composite tapes as they drive rollers 28. Such devices are well known to those skilled in the art, and typically provide a source of light impinging on a photosensitive detector or other radiation sensitive pickup, with a rotating slotted disc or other selectively transmissive mask mounted to be rotated by shaft 152. Since the rate of longitudinal travel of the composite tapes determines the rotational rate of shaft 152, encoder 151 is thus capable of producing the desired relationship between the rate and phase of the pulses produced at output 153, and the rate and phase of advancement of the tapes toward laminating station 19. Thus pulses available at output 153 are in turn applied to an input 154 of controller 132, which when enabled by other signals, conditions stepping motor 131 over a control line 155 to motivate screwjack assembly 128 by a predetermined amount.

The actual proportion or relation between the number of pulses generated by encoder 151 and the pull rate of the tapes, can be selected to suit the design requirements of a particular taper setup. For example, encoder 151 may provide a pulse rate of 75 pulses per inch of travel of tapes 11 through 15. It will be appreciated that the entire train of pulses from encoder 151 may be fed by controller 132 to stepping motor 131, in which case a maximum cross-sectional change in the opening 108 of die 105 will be produced for accommodating a maximum taper per unit length of composite tapes. On the other hand, controller 132 may selectively divide the raw output pulse from encoder 151 down to a level selected to accommodate the particular tapers produced by station 17. Thus in general, encoder 151 and controller 132 will be adjusted to provide a predetermined set of pulses to stepping motor 131, correlated to a particular repetitive taper pattern for which station 17 has been arranged to produce.

Because the operation of variable die 105 need only occur during the passage of the tapered sections through laminating station 19, means may be provided as in the present embodiment, for coordinating the initiation of opening and closing of die 105 with the longitudinal position of the various ply tapers. For this purpose, an electromechanical programmer 161 is provided, as diagrammatically illustrated in FIG. 1, for enabling controller 132 at the proper times to begin operating stepping motor 131 in response to the pulse train output from encoder 151. More particularly, programmer 161 may be an electromechanical apparatus as shown in FIG. 6, mechanically coupled to rotating shaft 152 for producing "start" and "stop" signals for enabling controller 132 as a taper approaches entry 114 of die 105, and disabling the controller as the terminal portions of the taper reach entry 114, whereafter a constant cross section of tape plies is presented to the die until the next, succeeding taper is presented to laminating station 19.

More particularly with reference to FIG. 6, programmer 161 includes a solenoid operated clutch 162 having an input shaft 163 coupled to shaft 152 of FIG. 1 for rotation thereby, and having a control signal input 164 for selectively coupling the input shaft 163 to and for rotation of an output shaft 166. Output shaft 166 is in turn connected to and for rotatably driving a programmer disc 167, which coacts with circumferentially spaced "start" and "stop" switches 168 and 169. The rotation of programmer disc 167 thus, automatically operates switches 168 and 169 in accordance with its phase of rotation, which in turn is determined by the longitudinal position of the composite tape plies through the rotational coupling of rollers 28, shaft 152, shaft 163, clutch 162 and shaft 166. Signal outputs 171 and 172 from start and stop switch 168 and 169 respectively, are applied to a start enable input 173 and a stop disable input 174 of controller 132 as shown in FIG. 4.

The programmer apparatus 161 as diagrammatically illustrated in FIGS. 1 and 6, thus provides for coordinating the start of die opening and closing by synchronizing the rotation of programmer disc 167 with the location of the oncoming taper.

Thus, solenoid operated clutch 162 may be energized over control input 164 simultaneously with the application of signals to the plurality of cutoff assemblies 61, 61′ and 61″ of taper forming station 17, to instantaneously engage the rotation of programmer disc 167 with the longitudinal advancement of the tapes, instantaneously synchronizing the phase of rotation of disc 167 with the position of the ensuing trailing taper formed by operating the cutters. After a predetermined amount of rotation of disc 167, start switch 168 is actuated, generating a start signal at output 171 which is applied to and for enabling input 173 of controller 132. This now enables controller 132 to operate stepping motor 131 in response to the pulse train from encoder 151 to begin closing die 105 at entry 114 through jackscrew assembly 128. Prior to this sequence, a stepping direction signal is applied to an input 176 of controller 132 to condition the controller for advancing stepping motor 131 for a trailing taper, and retracting stepping motor 131 for a leading taper. The signal applied to input 176 may be manually derived, or automatically produced by sensor means mounted along the path of the composite tapes, between station 17 and station 19 to sense the type of the advancing taper. It will be appreciated that once the phase of the direction signal has been established for input 176, that it will alternate between each adjacent taper, and thus this control may be readily automated. The controller 132 now cycles stepping motor 131 and screwjack assembly 128 through the predetermined steps or increments closing die 105 at entry 114 until programmer disc 167 rotates to a point which operates stop switch 169. Thereupon a stop signal is generated at output 172 of FIG. 6 and applied to stop-disable input 174 which terminates the responsiveness of controller 132 to the incoming pulse train from encoder 151. At this point, the taper has advanced into die 105 to a point where the taper is no longer decreasing and a constant cross section of minimum ply thickness enters opening 108 at entry 114. The downstream end of die 105 adjacent exit 116 provides the above described air spring force to continue to compress the joined tape plies as the taper passes completely through the die and exits therefrom as structural member 16.

De-energization of clutch 162 is provided either by feeding an output from stop switch 169 over output 172 to and for producing a de-energizing signal at control input 164 of the clutch, or in the alternative a third switch may be mounted in cooperation with programmer disc 167 for generating a clutch deactivation signal as the programmer disc reaches a certain rotational point after successively activating switches 168 and 169. In any event, the deactivation of clutch 162 is selected so that programmer disc 167 is disengaged from shaft 163 and shaft 152 at a predetermined rotational or angular condition in preparation of the activation of the next cycle.

In this instance, the next cycle will provide for opening die 105 as a leading or increasing taper follows in succession from the preceding decreasing or trailing taper. In this case, the signal energizing solenoid operated clutch 162 may be manually derived, by monitoring the advancement of the increasing taper and applying an electrical signal to input 164 when the first cut or leading end of a first variable ply reaches a predetermined longitudinal point relative to either laminating station 19 or frame 39. In any event, the operation of clutch 162 again drives programmer disc 167, causing it to activate start switch 168. Controller 132 again responds to the start signal at input 173 and drives stepping motor 131 and jackscrew assembly 128 to increase the spacing of the die opening. Continued incremental die opening occurs in response to the encoder pulses applied at input 154 to controller 132, so that the die opens in coordination with the entering, increasing taper, with this operation continuing until programmer disc 167 operates stop switch 169 terminating further activation of the screwjack assembly.

It will be appreciated that the coordination of the die apparatus as shown in FIG. 4 with the increasing and decreasing tapers, is provided substantially automatically, and independent of the actual pull rate applied to structural member 16. More particularly, the rate at which the composite tapes are pulled from taper forming station 17 and through laminating station 19, may vary with time, without interfering with or interrupting the operation of encoder 151, programmer 161 and controller 132, which are all based on the pull rate of the tapes as monitored at pinch rollers 28.

As an alternative to the foregoing method and apparatus, the variable die opening control may be limited in its opening and closing sequences, by the provision of limit switches, coacting with the relative proximity of die sections 106 and 107, or coacting with screwjack assembly 128 or stepping motor 131 to terminate further stepping of assembly 128 when a pre-established maximum or minimum dimension for spacing 112 has been reached. After reaching this limit, determined by the limit switches, further operation of stepping motor 131 by controller 132 in response to the encoder pulse train, will be ineffectual, and the control system may be reset for the next succeeding taper whether it be an increasing or decreasing taper.

Still another alternative to the foregoing control method and apparatus is to provide a commercially available, programmable controller adapted for operating screwjack assembly 218 and stepping motor 131.

TAPE FEED STATION

With reference to FIGS. 1, 7 and 8, tape feed station 18 is preferably provided by a plurality of tape or ply supply reels 23 mounted on a board or support 201 located upstream of taper forming station 17 as indicated in FIG. 1. More particularly, supply reels 23 are preferably mounted and constructed so as to be readily interchangeable, for replenishing the supply of source tapes, or for changing the dimensions or type of supply tape, without requiring excessive shutdown time for the system. Furthermore, the mounting of reels 23 preferably provides a predetermined drag or braking force resisting dereeling of the plies, in order to establish a suitable tension on the tape to maintain proper feed and alignment of the tapes as they are drawn toward and through taper forming station 17.

Accordingly, reels 23 are preferably of a construction and mounting which not only permits setting of a desired drag or braking force, but also allows for the quick demounting and remounting of ply or tape supply spools without disturbing the proper drag setting. These features are achieved in a compact device carried directly by the reel and the mounting therefor, thus conserving space and allowing a more dense accommodation of reels 23 on support 201. While only a relatively few number of reels 23 are illustrated in FIG. 1, it will be appreciated that up to 20 or more individual ply supply reels may be carried by a support 201, and in such case, the space saving feature of reels 23 is an important advantage.

With more particular reference to FIGS. 7 and 8, each reel 23 is here mounted on a cylindrical shaped spindle 202 fixedly mounted on support 201, to define a main body portion 203 extending outwardly from support 201 and a reduced diameter portion 204, in this instance located at the outermost axial end of main body portion 203. Support 201 may be provided as in this instance by a substantially planar, spindle board which may be mounted in a vertical plane from a floor stand 206, as shown in FIG. 1. Alternatively, support 201 and spindles 202 may be mounted in any desirable orientation, whether horizontal or vertical or at some angle therebetween as the fixture and drag provided thereby are independent of any gravitational forces.

Spindle 202 may be fixedly mounted to support 201 by a forced fit securement within a bore 207 transverse to the plane of board support 201, and with a head or radial flange 208 serving to secure the spindle against axial outward dislodgement. Flange 208 may be permanently secured to support 201, such as by welding at 209 where the spindle and support are of a metal material. However, neither support 201 nor spindle 202 need be made of metal, as other materials of suitable strength and durability may obviously be employed.

Mounted on spindle 202, and particularly on the relatively larger main body portion 203, is a two-part structure having a pair of hub sections 211a and b and a pair of rim sections 212a and b. Hub sections 211a and 211b are connected to the respective rim sections 212a and 212b by disc-like body portions 213a and 213b which extend radially outwardly of the hub sections and are coaxial therewith. In this instance, the adjoining hub, rim and body sections 211a, b; 212a, b and 213a, b respectively are integrally formed from a resiliently yieldable material, such as a vacuumed formed plastic, to define a pair of complementary, separatable supply spool cheek members 210a and 210b for receiving and retaining a ply spool 216 for coaxial rotation therewith about spindle 202. Spool 216 as indicated may be prewound with the desired source ply, which in this instance is provided by a ply in the form of a continuous, wound tape 217 which may be formed of a plurality of elongate fibers impregnated with a resin substance. Resin tape 217 may be interleaved with a release tape or layer to facilitate dereeling of the tacky resin tape as disclosed in accordance with my copending application entitled "METHOD AND APPARATUS FOR DEREELING INTERLEAVED TAPES", Ser. No. 578,878, filed May 19, 1975.

Each of rim sections 212a and 212b of members 210a and 210b are formed with an annular, radially extending flange portion defining inwardly confronting annular faces 221a and 221b respectively which seat against axial end portions 222a and 222b. Additionally, the rim sections of each member 210a and 210b define annular, substantially axially extending and radially outwardly facing shoulder portions 223a and 223b, on which, portions of an interior circumferential wall 224 of spool 216 adjacent end portions 220a and 220b seat when members 210a and 210b are pressed toward each other with spool 216 coaxially sandwiched therebetween as shown in FIG. 7. Rim sections 221a and 221b are disposed radially outwardly from the outer circumference of spindle 202 by disc-like body sections 213a and 213b to accommodate a particular, inside diameter of ply spool 216, and to afford a degree of resilient yieldability of the structure when an axial compression force is applied to opposite axial ends of hub sections 211a and 211b as described herein.

Preferably, annular shoulder portions 223a and 223b are provided with an interference fit with the inside diameter of spool 216 so that as the members 210a and 210b are pressed together on either side of the spool, it is firmly, positively clamped therebetween and coaxially aligned with the axis of spindle 202. Typically, spool 216 is formed of a yieldable material such as pasteboard, so that the interior wall 224 undergoes slight deformation as members 210a and 210b are clamped on either side. Also, an inwardly converging axial taper may be provided on shoulder portions 223a and 223b to produce a wedging action against the interior diameter of wall 224 of the supply spool to further secure and center the spool on the spindle.

Hub sections 211a and 211b of members 210a and 210b are axially spaced apart by spool 216 as shown in FIG. 7, in order to permit relative inward axial displacement of the hub sections under an axial compression load for the purpose of establishing the braking force or drag on reel 23. More particularly for this purpose, the preassembled spool 216 and cheek members 210a and 210b are mounted on spindle 202 with the inside diameter of hub sections 211a and 211b providing a clearance fit on the outside diameter of main body portion 203 of the spindle for free rotation thereabout. An axial end portion 226b of hub section 211b is pressed against a thrust washer 227 which defines an abutment 228 extending transversely to the axis of spindle 202 and which in this instance is in turn supported by a face 229 of support 201 adjacent the outwardly extending portion of the spindle and against which thrust washer 227 rests.

The opposite axial end of the assembled cheek members and supply spool is defined by an axial end portion 226a of hub section 211a and it is held under an axial restraint established by a presettable, quick-disconnect axial end retaining assembly 231 including a hollow cylindrical or tubular spacer 232, a lockable collar 233 and a removable sping clip 234. Assembly 231 is constructed so that a preselected braking force or drag may be applied to reel 23 against which the dereeling force or tension established in the tape downstream of the feed station acts. Moreover, this drag, once preset by assembly 231, remains undisturbed even though the reel is changed.

More particularly this is achieved by providing lockable collar 233 with a longitudinal positionable and lockable mounting on reduced diameter portion 204 of spindle 202 and with the outer circumference 236 of collar 233 equal to or less than the inside diameter of the interior wall 237 of spacer 233, such that the spacer and the reel hub may be released from the assembly by sliding them over the outer circumferential wall 236 of the collar. In this instance, collar 233 is threadably mounted on mating, exterior threads of reduced diameter portion 204 of the spindle such that the longitudinal position of the collar may be adjusted by rotatably threading the collar toward or away from the spindle's main body portion 203. Alternatively, the reduced diameter end may be unthreaded and the collar merely longitudinally slidable thereon, with a locking screw used to locate and retain the collar. A locking screw, such as an Allen screw 238 may be provided in a transverse, threaded bore of collar 233 to secure the collar at a preselected longitudinal position on portion 204.

The removable spring clip 234 releasably secures the axial placement of spacer 232 relative to the prepositioned lockable collar 233. In this instance, clip 234 is of a U configuration which provides outwardly deflectable leg portions which may be snapped in place about the threaded exterior of spindle portion 204, axially between collar 233 and spacer 232 to form a transverse obstruction or abutment against which an axial end 239 of spacer 233 abuts as a reaction of the resilient compression on reel member 210a and 210b. Thus, spacer 232 provides in this instance, an axially elongated annular spacer which is removably slidably mounted over collar 233 and may be fixed by spring clip 234 in a position having an axial end 241 coacting with abutment 238 provided by thrust washer 227 to retain opposed axial end portions 226a and 226b under resilient compression. This resilient compression provides a force acting on the end portions 226a and 226b which develops a braking force or drag against the dereeling action of the reel, which force or drag may be preset by the longitudinal position of lockable collar 233.

To adjust the drag on the reel 233, it is merely necessary to loosen locking screw 238 of collar 233 and adjust the longitudinal position of the collar on spindle portion 204.

Thus, it will be appreciated that the mounting fixture provides for the quick, demounting of any one of reels 23 as shown in FIG. 1 in connection with feed station 18, without disturbing the pre-established or preset drag determined by the longitudinal positioning of collar 233 for each tape reel mounting fixture. To remove a reel 23 for replacement or renewal, spacer 232 is grasped and pressed axially inwardly toward support 201, relieving the shear load on spring clip 234. The clip 234 is thereupon pulled transversely away from and off of reduced diameter spindle portion 204. Spacer 232 is now withdrawn along with cheek members 210a and 210b by withdrawing these members over collar 233. A full spool, similar to spool 216 may now be assembled between cheek members 210a and 210b and the components remounted onto the fixture. Replacement of spring slip 234 again establishes the desired, and previously set drag or braking force on the reel. No adjustment of lockable collar 233 is required.

The braking or drag force is infinitely adjustable because of the infinite longitudinal positions available for collar 233 on spindle portion 204. Moreover, by choice of fittings, tape or ply spools of various diameters and widths may be mounted on support 201 without changing the spindle, lockable collar or spring clip. For example, various tape widths may be accommodated by utilizing spools having the appropriate width and adjusting or selecting spacers, corresponding to spacer 232, having an appropriate, predetermined axial dimension. Similarly, variation in the tape roll or spool diameter, may be accommodated by utilizing spool cheek members, corresponding to members 210a and 210b, having appropriate radial dimensions between the hub sections and the reel sections.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

What is claimed is:

1. A method of fabricating an elongate, multiple ply laminated structure having a variable cross section, comprising the steps of:
   feeding a multiplicity of elongate plies from a source thereof into spaced apart planes, each of said plies being formed of resin impregnated fibrous material;
   continuously guiding at least one of said plurality of plies in a longitudinal guide path to define a carrier ply to which variable plies of selected discontinuous lengths derived from the remaining said multiplicity of plies are added to form a composite of said plies having said variable cross section;
   selectively feeding leading ends of said variable plies into longitudinal engagement with said carrier ply to form said composite with an increasing cross section and selectively severing said variable plies to form a decreasing cross section of said composite of plies; and
   pulling said composite of plies through a laminating means to laminate said plies into said laminated structure.

2. The method of claim 1, further comprising the steps of:

alternately repeating said steps of feeding and severing said variable plies to produce a laminated structure having longitudinally repetitive patterns of variable cross section.

3. The method of claim 1, wherein said step of laminating said composite of plies conmprises the substeps of pulling said composite through a heated die having a variable cross-sectional opening and automatically varying said die opening to accommodate the variable cross section of said composite of plies, whereby said die provides a substantially uniform transverse compression on said composite of plies independent of the changing cross section thereof.

4. The method set forth in claim 1, wherein said step of feeding said leading ends of said variable plies includes the substep of feeding said ends into adhesive contact with one of said plies of said composite of plies, whereby the pulling force applied to said composite of plies pursuant to said laminating step serves to effectively pull all of said variable plies which have been guided into contact with the carrier ply or the composite of plies formed thereon.

5. The method set forth in claim 1, wherein said leading ends of said variable plies are fed into engagement with said carrier ply at selected, longitudinally spaced intervals therealong such that said composite of said plies defines a leading taper of increasing cross section, and subsequently severing said variable plies at selected longitudinal intervals along said carrier ply to provide said composite with a trailing taper of decreasing cross section.

6. The method of claim 5, further comprising the steps of:

alternately repeating said steps of feeding and severing said variable plies to produce a composite of said plies defining longitudinally repetitive, leading and trailing tapers, whereby the laminated structure resulting therefrom may be severed at selected lengths to provide elongate laminated structural members having one or more longitudinal tapers.

7. An apparatus for fabricating an elongate, multiple ply laminated structure having a variable cross section, comprising in combination:

ply feed means for receiving a multiplicity of elongate plies, said ply feed means including guide means for longitudinally guiding said plies in spaced apart planes;

laminating means for longitudinally pulling said composite of plies from said ply feed means and through said laminating means; and variable cross section forming means disposed between said feed means and said laminating means and including carrier ply guide means and a plurality of variable ply guide and controller means, said carrier ply guide means disposed to receive at least one of said plies from said feed means and to guide it as a carrier ply along a longitudinal guide path as it is pulled toward said laminating means by said puller means, said plurality of variable ply guide and controller means disposed to individually receive a plurality of other said plies from said feed means and controllably feed variable, discontinuous lengths thereof as variable plies to said longitudinal guide path for forming said longitudinal composite with said carrier ply, each said variable ply guide and controller means including means for selectively transversely severing an associated said ply and means for selectively longitudinally feeding a leading end of a severed ply into said longitudinal guide path of said carrier ply for engagement with the composite of plies therein, said means for severing said plies being spaced at substantially equal transverse distances from said longitudinal guide path of said carrier ply and at predetermined longitudinal intervals along said longitudinal guide path of said carrier ply, means for joint, simultaneous operation of said means for severing said plies, and means for joint, simultaneous operation of said means for longitudinally feeding the leading end of a severed ply into said longitudinal guide path, whereby a laminated composite of said plurality of plies is produced with a variable cross section including a trailing taper of decreasing cross section and a leading taper of increasing cross section wherein the distances between the trailing ends of the plies of the trailing taper and the distances between the leading ends of the plies of the leading taper, respectively, are determined by said longitudinal intervals between said means for severing said plies.

8. The apparatus of claim 1, wherein said plurality of variable ply guide and controller means each comprise:

controllable feed roller means providing said means for longitudinally feeding an associated one of said variable plies into said longitudinal guide path of said carrier ply, and controllable cut-off means mounted adjacent to and downstream of said feed roller means for providing said means for severing an associated one of said variable plies.

9. The apparatus set forth in claim 7, wherein said plurality of variable ply guide and controller means comprise a separate support for each such means, said means for severing and longitudinally feeding said variable plies being mounted on said supports, an elongated frame means disposed between said ply feed means and said laminating means in longitudinal alignment with said guide path of said carrier ply, said supports being longitudinally movably mounted on said frame means for being adjustably positioned at predetermined longitudinal intervals with respect to said guide path of said carrier ply.

10. The apparatus set forth in claim 9, wherein carrier ply guide means is disposed on said frame means for guiding said carrier ply longitudinally thereof, said supports slidably mounted on track means extending substantially parallel to said longitudinal guide path of said carrier ply, and said means for severing said plies being mounted on said supports at substantially equal transverse distances from said longitudinal guide path.

11. The apparatus set forth in claim 1, wherein said variable cross section forming means further comprises a continuous cap ply guide means disposed to receive at least one of said multiplicity of elongate plies from said ply feed means and to guide such ply into said longitudinal guide path of said carrier ply downstream from said variable ply guide and controller means, whereby said continuous cap ply guide means superimposes a continuous cap ply on said composite of plies issued from said variable ply guide and controller means and previously combined with said carrier ply.

12. The apparatus set forth in claim 7, wherein said multiplicity of elongate plies are formed from resin impregnated fibers and exhibit substantial interply adherence when brought into contact with one another, and said plurality of variable ply guide and controller means each further including a set of pinch roller means aligned with said longitudinal guide path of said carrier ply for jointly receiving said carrier ply and an associated leading end of a severed ply from said variable ply guide and controller means and pressing said jointly received plies into engagement to cause said substantial adherence therebetween, whereafter the pulling of said composite of plies by said puller means is effective to draw one or more of said variable plies fed from said variable ply guide and controller means after the leading end of such ply has been pressed into engagement with the composite of plies traveling in the longitudinal guide path of said carrier ply.

13. The apparatus of claim 7, wherein said variable ply guide and controller means each comprise a ply guide chute means for guiding a leading end of a severed ply from said means for severing said ply to said longitudinal guide path of said carrier ply.

14. The apparatus of claim 13, wherein said guide chute means of each of said variable ply guide and controller means comprises a plurality of anti-friction guide rollers arranged in an array along opposite sides of a curvilinear guide path extending from said means for severing said ply toward said longitudinal guide path of said carrier ply and curving toward parallelism therewith in the direction of travel of said carrier ply toward said laminating means.

15. The apparatus set forth in claim 7, wherein said means for transversely severing an associated ply of each of said variable ply guide and controller means comprises:
cutter blade means pivotally mounted for rotation in a path transversely severing said associated ply; and
electromechanical means responsive to an electrical control signal for driving said cutter blade means through said path of rotation.

16. The apparatus set forth in claim 15, wherein said means for selectively longitudinally feeding a leading end of said severed ply into said longitudinal guide path comprises rotatably driven feed roller means mounted on each of said variable ply guide and controller means in feeding engagement with an associated one of said plurality of plies, said feed roller means being disposed adjacent to and upstream from said pivotally mounted cutter blade means, whereby the leading end of a severed ply remains in engagement with said feed roller means for being selectively advanced into said longitudinal guide path of said carrier ply.

17. In an apparatus for combining a plurality of elongate plies into a laminated structure, wherein said plies are dispensed from a plurality of spools of prewound plies, comprising in combination therewith:
a dereeling station including a supply spool support;
a plurality of cylindrically shaped spindles fixedly mounted to said support at spaced apart locations, each said spindle having a main body portion extending outwardly from said support and a reduced diameter portion at an axial end of said spindle spaced apart from said support;
a plurality of spool hubs, each having a central bore and being individually rotatably mounted on said spindles coaxial with said main body portions, each of said hubs being adapted to receive and hold at least one of the said spools coaxially therewith, said hubs each being resiliently compressible between opposed axial end portions adjacent said central bore;
a lockable collar longitudinally positionable and lockable on said reduced diameter portion of each of said spindles and having a maximum outer diameter less than that of said main body portion of said spindle;
an axially elongate annular spacer for each of said spindles removably slidably inserted over an associated one of said collars and having a first axial end positioned coaxially about said main body portion of said spindle and coacting with said support to abut and trap said hub end portions in compression therebetween; and
a removable spring clip cooperating with said collar and said annular spacer for each of said spindles, said spring clip selectively longitudinally retaining said annular spacer at an axial position on said spindle set by the position of said lockable collar to thereby exert an adjustable amount of compression on said hub end portions; whereby said compression exerts an adjustable braking drag on said hub and said hub and spool carried thereby may be quickly demounted from said spindle by removing said spring clip and slidably withdrawing said annular spacer and hub over said lockable collar without changing a drag setting established by the longitudinal position of said lockable collar on said reduced diameter portion of said spindle.

18. In the apparatus of claim 17, said reduced diameter portion of said spindle and said lockable collar being formed with cooperating exterior and interior threads respectively, and radially extending locking screw means mounted on said lockable collar for releasably locking said collar in place on said reduced diameter portion of said spindle, whereby said lockable collar may be threadedly set to a desired axial position on said reduced diameter portions and thereafter releasably locked in place by said screw means.

19. In the apparatus set forth in claim 17 each of said plurality of spool hubs comprising:
a pair of complimentary split-half hub portions, each hub portion having a radially extending disc-like body portion formed of resiliently yieldable material, said disc-like body portions having inwardly confronting axially extending annular spool seat portions radially outwardly spaced from said hub portions for receiving and retaining one of said ply spools therebetween with said disc-like body portions affording resilient axial yieldability in response to said axial compression applied to opposed axial end portions of said hub.

20. An apparatus for fabricating an elongate, multiple ply laminated structure having a variable cross section, comprising in combination:
ply feed means for receiving a multiplicity of elongate plies, said ply feed means including guide means for longitudinally guiding said plies in spaced apart planes;
laminating means for longitudinally receiving and laminating a longitudinal composite of at least certain of said multiplicity of plies;
puller means for longitudinally pulling said composite of plies from said ply feed means and through said laminating means;
variable cross section forming means disposed between said feed means and said laminating means and including carrier ply guide means and a plurality of variable ply guide and controller means, said carrier ply guide means disposed to receive at least one of said plies from said feed means and to guide it as a carrier ply along a longitudinal guide path as it is pulled toward said laminating means by said puller means, said plurality of variable ply guide and controller means disposed to individually receive a plurality of other said plies from said feed means and controllably feed variable, discontinuous lengths thereof to said longitudinal guide path for forming said longitudinal composite with said carrier ply, each said variable ply guide and controller means including means for selectively transversely severing an associated said ply and means for selectively longitudinally feeding a leading end of a severed ply into said longitudinal guide path of said carrier ply for engagement with the composite of plies therein, whereby a laminated composite of said plurality of plies is produced with a variable cross section determined by the selective operation of said variable ply guide and controller means; and said laminating means comprising die means having a die opening for longitudinally receiving and transversely compressing said composite of said plies, said opening of said die means being variable in a transverse dimension corresponding to said variable cross section of said composite of plies, electromechanical means responsive to a control signal for adjustably opening and closing said variable opening of said die means as a function of the longitudinal position of the variable cross section of said composite of plies, and electromechanical sensor means coacting with said composite of plies upstream of said die means for developing said control signal in response to the rate of longitudinal advancement of said composite of plies in said longitudinal guide path.

21. An apparatus for fabricating an elongate, multiple ply laminated structure having a variable cross section, comprising in combination:

ply feed means for receiving a multiplicity of elongate plies, said ply feed means including guide means for longitudinally guiding said plies in spaced apart planes, and a dereeling station having a supply spool support for holding a plurality of spools of said plies prewound thereon, a plurality of cylindrically shaped spindles fixedly mounted to said support at spaced apart locations, each of said spindles having a main body portion extending outwardly from said support and a reduced diameter portion at an end thereof spaced apart from said support, a plurality of spool hubs, each of said hubs having a central bore and being individually rotatably mounted on said spindles coaxial with said main body portions, each of said hubs being adapted to receive and hold at least one of said ply spools coaxially therewith and said hubs each being resiliently compressible between opposed axial end portions adjacent said central bore, a lockable collar longitudinally positionable and lockable on said reduced diameter portion of each of said spindles and having an outer diameter equal to or less than that of said main body portion of said spindle, an axially elongate annular spacer mounted on each said spindle removably slidably inserted over said collar and having one axial end positioned coaxially about said main body portion and coacting with said support to abut and trap said hub end portions in resilient compression therebetween, and a removable spring clip coacting with each said collar and with each said annular spacer to selectively longitudinally position and retain said annular spacer to selectively longitudinally position and retain said annular spacer at a predetermined longitudinal position on said spindle, whereby said resilient compression exerts an adjustable braking drag on said hub and said hub and spool can be quickly demounted from said spindle by removing said spring clip and slidably withdrawing said annular spacer and hub over said collar without changing the drag setting established by the longitudinal, locked position of said collar;

laminating means for longitudinally receiving and laminating a longitudinal composite of at least certain of said multiplicity of plies;

puller means for longitudinally pulling said composite of plies from said ply feed means and through said laminating means; and variable cross section forming means disposed between said feed means and said laminating means and including carrier ply guide means and a plurality of variable ply guide and controller means, said carrier ply guide means disposed to receive at least one of said plies from said feed means and to guide it as a carrier ply along a longitudinal guide path as it is pulled toward said laminating means by said puller means, said plurality of variable ply guide and controller means disposed to individually receive a plurality of other said plies from said feed means and controllably feed variable, discontinuous lengths thereof to said longitudinal guide path for forming said longitudinal composite with said carrier ply, each said variable ply guide and controller means including means for selectively transversely severing an associated said ply and means for selectively longitudinally feeding a leading end of a severed ply into said longitudinal guide path of said carrier ply for engagement with the composite of plies therein whereby a laminated composite of said plurality of plies may be produced with a variable cross section determined by the selective operation of said variable ply guide and controller means.

22. The method set forth in claim 1, further comprising the steps of:

sequentially feeding said variable plies into longitudinally aligned engagement with said carrier ply in order to position the leading ends thereof at predetermined spaced apart longitudinal positions therealong, and sequentially severing said variable plies to position the trailing ends of such plies at predetermined, spaced apart longitudinal intervals along said carrier ply.

* * * * *